United States Patent
Chan

(10) Patent No.: US 8,985,254 B2
(45) Date of Patent: Mar. 24, 2015

(54) PEDAL DRIVEN APPARATUS HAVING A MOTOR

(71) Applicant: Foster Assets Corporation, Kwun Tong (HK)

(72) Inventor: Yet Chan, Kowloon (HK)

(73) Assignee: Foster Assets Corporation, Kwun Tong (HK)

( * ) Notice: Subject to any disclaimer, the term of this patent is extended or adjusted under 35 U.S.C. 154(b) by 35 days.

(21) Appl. No.: 13/630,168

(22) Filed: Sep. 28, 2012

(65) Prior Publication Data
US 2013/0075176 A1    Mar. 28, 2013

Related U.S. Application Data

(63) Continuation-in-part of application No. 12/691,991, filed on Jan. 22, 2010, now Pat. No. 8,590,655.

(51) Int. Cl.
| | |
|---|---|
| *B62K 11/00* | (2006.01) |
| *B62M 6/55* | (2010.01) |
| *F16H 3/72* | (2006.01) |
| *F16H 55/30* | (2006.01) |
| *F16H 1/32* | (2006.01) |

(52) U.S. Cl.
CPC .............. *B62M 6/55* (2013.01); *F16H 3/724* (2013.01); *F16H 55/30* (2013.01); *F16H 2001/325* (2013.01)
USPC .................. 180/206.4; 180/206.1; 180/205.1

(58) Field of Classification Search
USPC ................................ 180/205.1, 206.1, 206.4
See application file for complete search history.

(56) References Cited

U.S. PATENT DOCUMENTS

| | | | | |
|---|---|---|---|---|
| 5,749,429 A * | 5/1998 | Yamauchi et al. | ......... | 180/206.4 |
| 5,941,333 A * | 8/1999 | Sun et al. | ................... | 180/206.4 |
| 6,012,538 A * | 1/2000 | Sonobe et al. | ................ | 180/220 |
| 6,196,347 B1 * | 3/2001 | Chao et al. | ................. | 180/206.2 |
| 6,296,072 B1 | 10/2001 | Turner | | |
| 6,672,418 B1 * | 1/2004 | Makino | ...................... | 180/206.3 |
| 7,273,123 B2 * | 9/2007 | Perng | ......................... | 180/206.4 |
| 7,766,114 B2 * | 8/2010 | Lee et al. | .................... | 180/206.4 |
| 2010/0051373 A1 * | 3/2010 | Lee et al. | ....................... | 180/205 |

* cited by examiner

Primary Examiner — Kevin Hurley
Assistant Examiner — Michael Stabley
(74) Attorney, Agent, or Firm — Renner Kenner Greive Bobak Taylor & Weber

(57) ABSTRACT

A pedal driven apparatus for a hybrid bicycle can be manually propelled, but also includes a motor unit for forward propulsion of the bicycle. The apparatus comprises manually operable pedals fixed for rotation with a pedal spindle for receiving a manually provided driving force, and a motor having a shaft for receiving a motor provided driving force. A first torque transmission path transfers the manually provided driving force to a sprocket of the pedal driven apparatus, and a second torque transmission path transfers the motor provided driving force to the sprocket of the pedal driven apparatus. A first one way drive means is provided in the first torque transmission path and second one way drive means is provided in the second torque transmission path. The manual driving force and motor driving force may be used separately or combined.

32 Claims, 18 Drawing Sheets

FIG.3   B-B

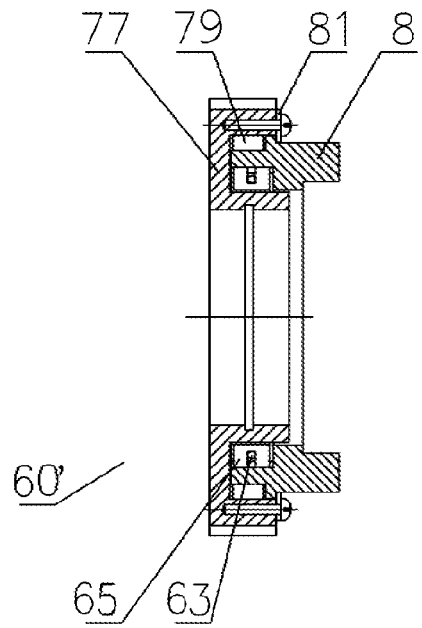
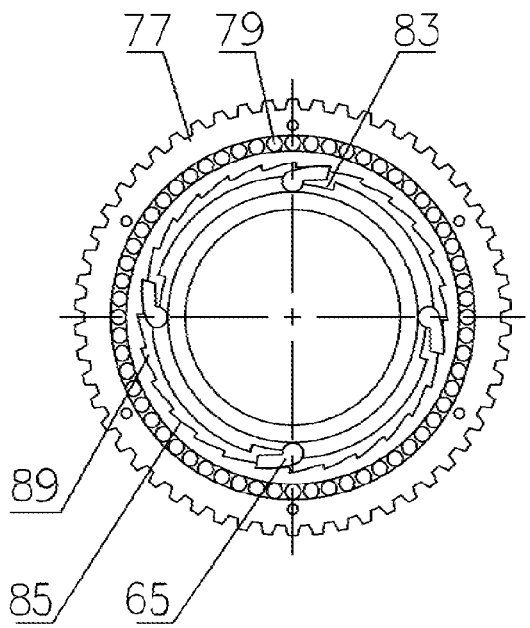
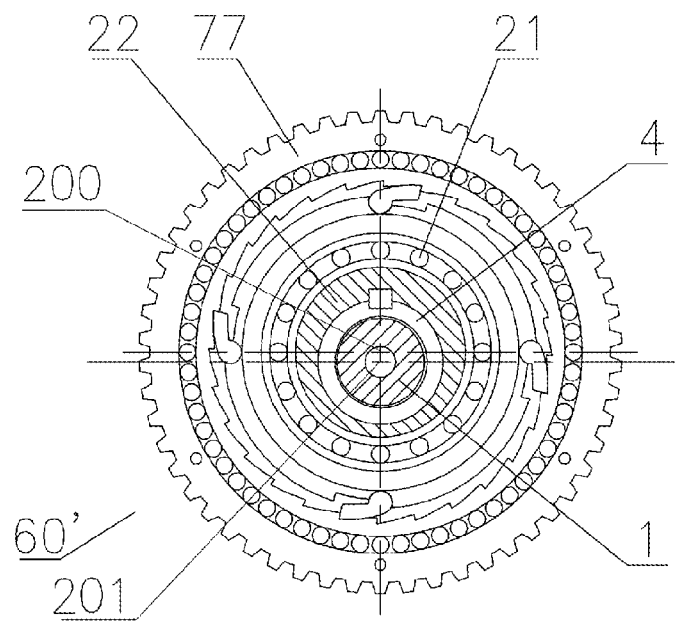

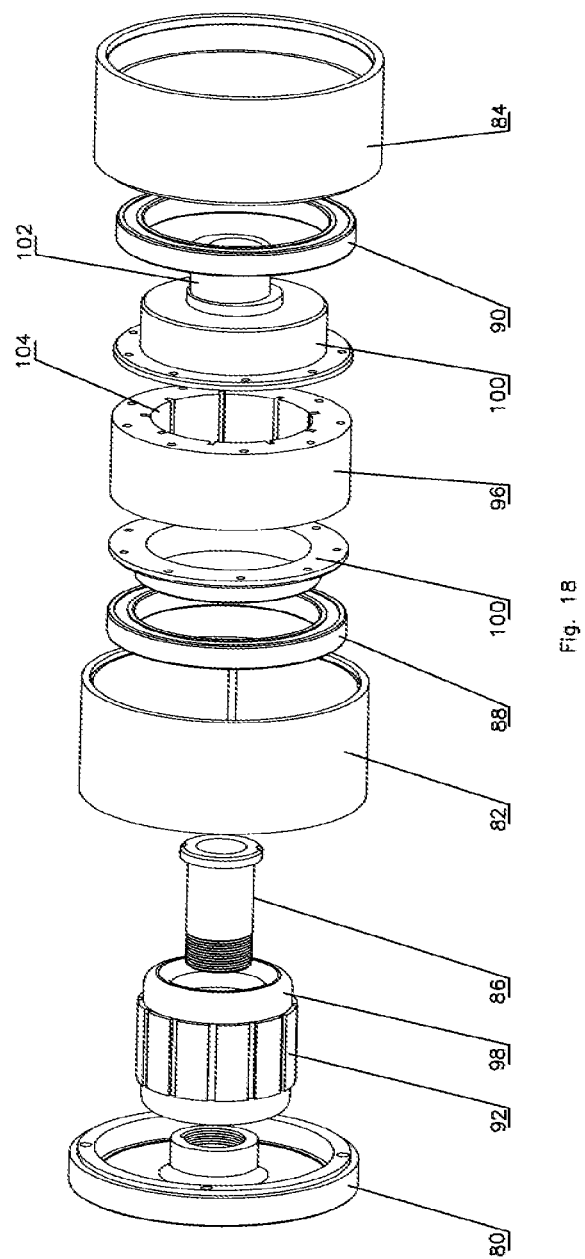

PEDAL DRIVEN APPARATUS HAVING A MOTOR

CROSS REFERENCES TO RELATED APPLICATIONS

This application is a continuation-in-part of application Ser. No. 12/691,991, filed 22 Jan. 2010.

FIELD OF THE INVENTION

The invention relates to a pedal driven apparatus which can be manually propelled, but which includes a motor unit for also causing forward propulsion of the apparatus. The invention relates particularly, but not exclusively, to pedal driven wheeled apparatuses or vehicles such as bicycles having an electric motor powered by a battery pack carried on the vehicle.

BACKGROUND OF THE INVENTION

It is known to provide some manually propellable wheeled vehicles or apparatuses such as bicycles with a motor unit to assist a user in powering the apparatus, especially up sloping terrain, e.g. hills, although the motor unit may sometimes used by itself to power the bicycle over any terrain.

It is also known to utilize an in-wheel motor in an electric motor assisted bicycle such that a transmission can be omitted and the resulting apparatus is easy and simple to manufacture. For such a known electric motor assisted bicycle using an in-wheel motor, it can be manufactured by simply replacing a hub of one wheel with an in-wheel motor, while the pedals drive the rear wheel through a sprocket and a chain in a generally conventional manner. In such an arrangement, no motor drive force need be transferred through the bicycle chain. Therefore, a pedal driving force and a motor driving force are delivered quite separately from each other.

One consequence of the known in-wheel motor arrangement is that it is not feasible for an in-wheel electric motor assisted bicycle to be developed with additional functions such as gear shifting, operating with a clutch, functioning as an exercise bicycle, or using the motor to generate power, i.e. it does not afford easy expansion of its functions. It also creates production and assembly problems as well as replacement parts problems. Where an in-wheel motor fails or requires maintenance, for example, it requires the wheel to be removed thus disabling the bicycle. Under some motor failure or maintenance conditions, it may no longer be possible to rotate the wheel accommodating the in-wheel motor such that it is not even possible to propel the bicycle under manually applied pedal power.

In addition to the known electric bicycle using an in-wheel motor, there is at least one other type of electric bicycle which uses a wheel-driving motor. However, in this type of electric bicycle, a motor driving force and a pedal driving force are also separately delivered from each other. This type of electric bicycle has similar disadvantages in that gear shifting can not be easily realized using a rear wheel transmission when the electric bicycle is being propelled using the wheel-driving motor.

The foregoing are just some of the common problems encountered with conventional hybrid motor assisted pedal driven apparatuses such as bicycles.

SUMMARY OF THE INVENTION

An object of the invention is to provide an improved pedal driven apparatus having a motor unit.

Another object of the invention is to provide an improved electric motor assisted bicycle.

Another object of the invention is to mitigate or obviate to some degree one or more problems associated with known hybrid bicycles or pedal driven apparatuses.

One skilled in the art will derive from the following description other objects of the invention. Therefore, the foregoing statements of object are not exhaustive and serve merely to illustrate some of the many objects of the present invention.

In a first main aspect of the invention, there is provided a pedal driven apparatus which contains manually operable pedals fixed for rotation with a pedal spindle for receiving a manually provided driving force and a motor having a shaft for receiving a motor provided driving force. A first torque transmission path is provided for transferring the manually provided driving force to a sprocket of the pedal driven apparatus and a second torque transmission path is provided for transferring the motor provided driving force to said sprocket of the pedal driven apparatus. A first one way drive means is also provided in the first torque transmission path between the pedal spindle and the sprocket such that when the sprocket is being driven by the motor provided driving force through the second torque transmission path, the pedal spindle is able to freewheel. A second one way drive means is provided in the second torque transmission path between the motor shaft and the sprocket such that when the sprocket is driven by the manually provided driving force through the first torque transmission path, the motor shaft is not caused to rotate. The second one way drive means has an axis of rotation offset by a predetermined amount with respect to an axis of rotation of the motor shaft.

The second torque transmission path may include the motor shaft and a gear mechanism mechanically coupling the motor shaft to the sprocket. The gear mechanism has a reduction gear ratio and operates to transfer the motor provided driving force from the motor shaft to the sprocket as the reduction gear ratio. The gear mechanism includes a planetary gear mechanism having a planet gear whose axis of rotation is offset by a predetermined amount with respect to the axis of rotation of the motor shaft. A one way ratchet is fixed onto the planet gear to rotate together with the planet gear, and has a ratchet axis co-incident with the axis of rotation of the planet gear.

Preferably, the planet gear is rotatably supported on an eccentric wheel whereby the planet gear and the one way ratchet are made to rotate as the eccentric wheel rotates. Positions of the axis of rotation of the planet gear and the ratchet axis of the one way ratchet change relative to the axis of rotation of the motor shaft as the planet gear and the one way ratchet rotate such that the varying positions of the axis of rotation of the planet gear and the ratchet axis of the one way ratchet define a circle centered on the axis of rotation of the motor shaft. The circle has a radius equal to the predetermined offset amount.

The gear mechanism may include a floating carrier mechanism which is configured to transfer the motor provided driving force to the sprocket.

Preferably, the floating carrier mechanism contains an output flange and a floating carrier positioned between the one way ratchet and the output flange. The output flange is mechanically coupled to the sprocket. The floating carrier is movably coupled to the one way ratchet as well as to the output flange such that the motor provided driving force is transferred to the sprocket through the floating carrier and the output flange.

On a surface of the one way ratchet facing the floating carrier, there may be arranged one or more blocks. One or more slots may be provided on a corresponding surface of the floating carrier facing the one way ratchet. The one or more blocks each is adapted to be received and confined by a corresponding one of the one or more slots such that the floating carrier is driven to rotate by a rotation of the one way ratchet via a transfer of the motor provided driving force between the one or more blocks of the one way ratchet and the one or more slots of the floating carrier.

In a preferred embodiment, a rolling friction exists between each block of the one or more blocks of the one way ratchet and the corresponding one of the one or more slots of the floating carrier.

Preferably, the floating carrier mechanism contains one or more rollers each corresponding to one of the one or more blocks and a corresponding one of the one or more slots. Each roller is adapted to fit in-between the corresponding block and an end of the corresponding slot. When the one way ratchet rotates due to the motor provided driving force, each block pushes against the corresponding roller and causes the corresponding roller to rotate, which in turn pushes against the end of the slot of the corresponding floating carrier, resulting in the floating carrier rotating.

Similarly, on a surface of the floating carrier facing the output flange, there may be arranged one or more blocks. One or more slots may be provided on a corresponding surface of the output flange facing the floating carrier. The one or more blocks each is adapted to be received and confined by a corresponding one of the one or more slots such that the output flange is driven to rotate by a rotation of the floating carrier via a transfer of the motor provided driving force between the one or more blocks of the floating carrier and the one or more slots of the output flange.

In a preferred embodiment, a rolling friction exists between each block of the one or more blocks of the floating carrier and the corresponding one of the one or more slots of the output flange.

Preferably, the floating carrier mechanism contains one or more rollers each corresponding to one of the one or more blocks and a corresponding one of the one or more slots. Each roller is adapted to fit in-between the corresponding block and an end of the corresponding slot. When the floating carrier rotates due to the motor provided driving force, each block pushes against the corresponding roller and causes the corresponding roller to rotate, which in turn pushes against the end of the corresponding slot of the output flange, resulting in the output flange rotating.

In a second main aspect of the invention, there is provided a motor for a pedal driven apparatus. The motor includes an output end for receiving a motor provided driving force; and a gear mechanism mechanically coupling the output end to a sprocket of the pedal driven apparatus. The gear mechanism has a reduction gear ratio and operates to transfer the motor provided driving force from the output end to the sprocket at the reduction gear ratio. The motor is arranged concentrically around a pedal spindle of the pedal driven apparatus such that the pedal spindle is freely accommodated through a hollow bore of a shaft sleeve and such that axes of rotation of the motor and the pedal spindle are parallel. A stator of the motor is positioned to surround the shaft sleeve. The stator of the motor is further sleeved by a rotor of the motor such that the rotor is rotatable with respect to the stator.

Preferably, the motor further comprises a rotor carrier mechanically fixed to the rotor so that the rotor carrier rotates together with the rotor. The rotor carrier has an end portion which outputs said motor provided driving force.

In a third main aspect of the invention, there is provided a sprocket assembly for a pedal driven apparatus, which includes a sprocket, first means for mechanically coupling the sprocket to a pedal driven pedal spindle, and second means for mechanically coupling the sprocket to an output shaft of a motor. The first mechanical coupling means includes a first one way drive means coupling the pedal spindle and the sprocket such that the first one way drive means transfers a manually provided driving force applied to the pedals of the pedal driven apparatus to the sprocket to cause rotation of the sprocket and allows the pedal spindle to freewheel when the sprocket is being driven by the motor output shaft. The second mechanical coupling means includes a second one way drive means coupling the motor shaft and the sprocket such that the second one way drive means transfers a motor provided driving force to the sprocket to cause rotation of the sprocket and does not cause the motor shaft to rotate when the sprocket is being driven by the manually provided driving force. The second one way drive means has an axis of rotation offset by a predetermined amount with respect to an axis of rotation of said motor shaft.

In a fourth main aspect of the invention, there is provided a pedal driven apparatus comprising: manually operable pedals fixed for rotation with a pedal spindle for receiving a manually provided driving force; a motor having a shaft for receiving a motor provided driving force; a first torque transmission path for transferring the manually provided driving force to a sprocket of the pedal driven apparatus; a second torque transmission path for transferring the motor provided driving force to said sprocket of the pedal driven apparatus; wherein a first one way drive means is provided in the first torque transmission path between the pedal spindle and the sprocket such that when the sprocket is being driven by the motor provided driving force through the second torque transmission path, the pedal spindle is able to freewheel.

An advantage of this arrangement is that it is not necessary to provide a freewheel sprocket on the rear wheel of a bicycle having a motor and sprocket assembly as defined by the first main aspect of the invention for a pedal driven apparatus. This is because the first one way drive means provides this function in addition to enabling the pedal spindle to freewheel when the motor drive is operating.

The motor may be arranged concentrically around the pedal spindle such that the pedal spindle is freely accommodated through a hollow bore of the motor shaft and such that their axes of rotation are parallel. The pedal spindle and the motor shaft preferably share the same axis of rotation.

This arrangement results in a neat and compact integration of the motor with the pedal spindle and sprocket assembly.

The first torque transmission path may comprise the manually operable pedals, the pedal spindle to which the pedals are affixed for rotation therewith, and the first one way drive means, wherein the first one way drive means mechanically couples the pedal spindle to the sprocket such that the first one way drive means transfers the manually provided driving force applied to the pedals to the sprocket to cause rotation of the sprocket and wherein the first one way drive means allows the pedal spindle to freewheel when the sprocket is being driven by the motor shaft. Preferably, the first one way drive means comprises a freewheel device such as an over-running bearing or an over-running clutch or any device suitable for enabling drive to be applied through an output member of the one way drive means, but for an input member to freewheel when no drive is being transferred through said first one way drive means.

The first one way drive means may be associated with one of the manually operable pedals affixed to the pedal spindle for rotation therewith, said one of the pedals comprising one of two pedals which is affixed to an end of the pedal spindle on a sprocket side of the pedal driven apparatus.

The second torque transmission path may comprise the motor shaft and a gear mechanism mechanically coupling the motor shaft to the sprocket, wherein the gear mechanism has a reduction gear ratio and operates to transfer the motor provided driving force from the motor shaft to the sprocket at said reduction gear ratio. The gear mechanism may comprise a planetary gear mechanism having a planet gear whose axis of rotation is offset by a predetermined amount with respect to the axis of rotation of the motor shaft.

This allows a high speed motor to be employed whereby the gear mechanism applies a suitable reduction gear ratio to the output shaft of the motor to rotate the sprocket at high torque and low speed (relatively speaking when compared to the motor shaft speed of rotation).

The planet gear may be rotatably supported on an eccentric wheel whereby the planet gear is made to rotate as the eccentric wheel rotates and whereby the position of the axis of rotation of the planet gear changes relative to the axis of rotation of the motor shaft as the planet gear rotates such that the varying position of the axis of rotation of the planet gear defines a circle centred on the axis of rotation of the motor shaft, said circle having a radius equal to the predetermined offset amount. The planet gear may have a smaller diameter than an internal ring gear within which it locates for rotation therewithin, the internal ring gear being fixed in position and having a central axis co-incident with the axis of rotation of the motor shaft, the planet gear having a smaller number of teeth than the internal ring gear. The planet gear may be rotatably supported on the eccentric wheel by a bearing or a bush.

The planet gear rotates around the inner toothed surface of the inner ring gear such that the outer toothed surface of the planet gear meshes with only a small number of teeth of the inner ring gear at any point of time.

A planet gear carrier of the planetary gear mechanism may be configured to transfer the motor provided driving force to the sprocket.

Using a planet gear carrier of the gear mechanism in this way provides a neat and efficient way of mechanically transferring the motor driving force to the sprocket assembly.

The planetary gear mechanism may include a counterbalance member which is configured to counterbalance an imbalance of weight caused by the offsetting of the planet gear with respect to the axis of rotation of the motor shaft. The counterbalance member may comprise a generally semi-circular weighted member which is arranged to rotate with the planet gear so as to counterbalance the planet gear when the planet gear is rotating.

Preferably, the planetary gear mechanism does not include a weighted counterbalance member, but comprises first and second identical planet gears arranged half a revolution out of phase with each other such that said first and second planet gears counterbalance each other on rotation. Preferably also, the first and second planet gears are located for rotation half a revolution out of phase with each other within a common, single internal ring gear. Each of the first and second planet gears may be supportably mounted on respective first and second eccentric wheels.

The use of two out of phase planet gears negates the need to provide a weighted counterbalance member and provides a balanced system which transfers motor driving force to the sprocket assembly more efficiently and quietly than the foregoing arrangement including a weighted counterbalance.

The planet gear carrier may be affixed to the sprocket for rotation therewith. The planet gear carrier may also be affixed to an output member of the first one way drive means for rotation therewith, whereby the manually provided driving force applied to the pedals is transferred via the first torque transmission path to the motor shaft through the planetary gear mechanism as well as to the sprocket.

In this arrangement, a user can, through use of a control mounted, for example, on the handlebar of the bicycle or any manually accessible location on the pedal driven apparatus, control the motor to act as a power generator. The user may operate a switch to control the motor to use mechanical power being provided manually through the pedals and which causes the motor shaft to rotate to generate electric power for recharging the motor battery pack or powering lights, for example.

Preferably, the gear mechanism comprises a toothless planetary gear mechanism having a toothless planet gear whose axis of rotation is offset by a predetermined amount with respect to the axis of rotation of the motor shaft and wherein the reduction gear ratio of the toothless planetary gear mechanism is defined by a relationship between the respective diameters of the toothless planet gear and a toothless internal ring gear within which the planet gear is located for rotation, the toothless planet gear having a smaller diameter than the toothless internal ring gear.

The advantage of a toothless planetary gear mechanism is one of quietness. The lack of gear teeth and the reliance on contact between generally smooth surfaces to effect a transfer of power from the motor to the sprocket results in very quiet operation and more efficient power transfer as there is no slippage between gear teeth as can occur in toothed gear mechanisms.

The toothless planet gear may be rotatably supported on an eccentric wheel whereby the toothless planet gear is made to rotate as the eccentric wheel rotates and whereby the position of the axis of rotation of the toothless planet gear changes relative to the axis of rotation of the motor shaft as the toothless planet gear rotates such that the varying position of the axis of rotation of the toothless planet gear defines a circle centred on the axis of rotation of the motor shaft, said circle having a radius equal to the predetermined offset amount.

The toothless internal ring gear may be fixed in position and may have a central axis co-incident with the axis of rotation of the motor shaft.

The toothless planet gear may be rotatably supported on the eccentric wheel by a bearing or a bushing.

A planet gear carrier of the toothless planetary gear mechanism may be configured to transfer the motor provided driving force to the sprocket.

The toothless planetary gear mechanism may includes a counterbalance member which is configured to counterbalance an imbalance of weight caused by the offsetting of the toothless planet gear with respect to the axis of rotation of the motor shaft. The counterbalance member may comprise a generally semi-circular weighted member which is arranged to rotate with the toothless planet gear so as to counterbalance the toothless planet gear when the toothless planet gear is rotating.

Preferably, the toothless planetary gear mechanism does not include a weighted counterbalance member, but comprises first and second identical toothless planet gears arranged half a revolution out of phase with each other such that said first and second toothless planet gears counterbalance each other on rotation. Preferably, the first and second toothless planet gears are located for rotation half a revolution out of phase with each other within a common, single toothless internal ring gear. Each of the first and second toothless planet gears may be supportably mounted on respective first and second eccentric wheels.

The planet gear carrier may be affixed to the sprocket for rotation therewith. The planet gear carrier may also be affixed to an output member of the first one way drive means for rotation therewith, whereby the manually provided driving force applied to the pedals is transferred via the first torque transmission path to the motor shaft through the toothless planetary gear mechanism as well as to the sprocket.

The toothless planet gear may be rotatably supported on the eccentric wheel with its axis of rotation is offset by a predetermined amount with respect to the axis of rotation of the motor shaft and located within the toothless internal ring gear such that its outer surface engages a toothless inner ring gear inner surface by heating the toothless internal ring gear and shrink fitting it over the toothless planet gear. The inner surface of the internal ring gear and/or the outer surface of the planet gear may be roughened to enhance the coefficient of friction acting between said engaged surfaces at their line of contact.

The first and second toothless planet gears are preferably rotatably supported respectively on the first and second eccentric wheels with their axes of rotation offset by a predetermined amount with respect to the axis of rotation of the motor shaft and located within a common, single toothless internal ring gear for rotation half a revolution out of phase with each other to engage a toothless inner ring gear surface by heating the toothless internal ring gear and shrink fitting it over the first and second toothless planet gears. The inner surface of the internal ring gear and/or the outer surfaces of the planet gear may be roughened to enhance the coefficient of friction acting between said engaged surfaces at their lines of contact.

Preferably, a second one way drive means is provided in the second torque transmission path between the motor shaft and the sprocket such that when the sprocket is being driven by the manually provided driving force through the first torque transmission path, the motor shaft is not caused to rotate. The second one way drive means may comprise at least one ratchet member moveably disposed on the planet gear carrier and arranged to engage a rack of a ratchet wheel fixed to rotate with the sprocket. The at least one ratchet member may have associated therewith means for resiliently biasing a free end of said ratchet member outwardly from a surface of the planet gear carrier such that said free end of the ratchet member engages a tooth in the rack of the ratchet wheel.

Preferably, the pedal driven apparatus comprises a bicycle, although the present invention is not limited to bicycles, but can be applied to any pedal driven apparatus.

The motor is preferably an electric motor powered by a battery pack carried on the pedal driven apparatus.

In a fifth main aspect of the invention, there is provided a motor for a pedal driven apparatus comprising: a shaft for receiving a motor provided driving force; and a gear mechanism mechanically coupling the motor shaft to a sprocket of the pedal driven apparatus, wherein the gear mechanism has a reduction gear ratio and operates to transfer the motor provided driving force from the motor shaft to the sprocket at said reduction gear ratio and wherein the motor is arranged concentrically around a pedal spindle of the pedal driven apparatus such that the pedal spindle is freely accommodated through a hollow bore of the motor shaft and such that their axes of rotation are parallel.

Preferably, the pedal spindle and the motor shaft share the same axis of rotation.

The gear mechanism preferably comprises a planetary gear mechanism having a planet gear whose axis of rotation is offset by a predetermined amount with respect to the axis of rotation of the motor shaft. The planet gear is preferably rotatably supported on an eccentric wheel whereby the planet gear is made to rotate as the eccentric wheel rotates and whereby the position of the axis of rotation of the planet gear changes relative to the axis of rotation of the motor shaft as the planet gear rotates such that the varying position of the axis of rotation of the planet gear defines a circle centred on the axis of rotation of the motor shaft, said circle having a radius equal to the predetermined offset amount.

Preferably, the planet gear has a smaller diameter than an internal ring gear within which it locates for rotation therewithin, the internal ring gear being fixed in position and having a central axis co-incident with the axis of rotation of the motor shaft, the planet gear having a smaller number of teeth than the internal ring gear. Preferably, the planet gear is rotatably supported on the eccentric wheel by a bearing.

Preferably, a planet gear carrier of the planetary gear mechanism is configured to transfer the motor provided driving force to the sprocket of the pedal driven apparatus.

The planetary gear mechanism may include a counterbalance member which is configured to counterbalance an imbalance of weight caused by the offsetting of the planet gear with respect to the axis of rotation of the motor shaft. The counterbalance member may comprise a generally semi-circular weighted member which is arranged to rotate with the planet gear so as to counterbalance the planet gear when the planet gear is rotating.

Preferably, the planetary gear mechanism does not include a weighted counterbalance member, but comprises first and second identical planet gears arranged half a revolution out of phase with each other such that said first and second planet gears counterbalance each other on rotation. Preferably, the first and second planet gears are located for rotation half a revolution out of phase with each other within a common, single internal ring gear. Preferably, the first and second planet gears are supportably mounted on respective first and second eccentric wheels.

Preferably, the gear mechanism comprises a toothless planetary gear mechanism having a toothless planet gear whose axis of rotation is offset by a predetermined amount with respect to the axis of rotation of the motor shaft and wherein the reduction gear ratio of the toothless planetary gear mechanism is defined by a relationship between the respective diameters of the toothless planet gear and a toothless internal ring gear within which the planet gear is located for rotation, the toothless planet gear having a smaller diameter than the toothless internal ring gear.

Preferably, the toothless planet gear is rotatably supported on an eccentric wheel whereby the toothless planet gear is made to rotate as the eccentric wheel rotates and whereby the position of the axis of rotation of the toothless planet gear changes relative to the axis of rotation of the motor shaft as the toothless planet gear rotates such that the varying position of the axis of rotation of the toothless planet gear defines a circle centred on the axis of rotation of the motor shaft, said circle having a radius equal to the predetermined offset amount.

Preferably, the toothless internal ring gear is fixed in position and has a central axis co-incident with the axis of rotation of the motor shaft.

Preferably, the toothless planet gear is rotatably supported on the eccentric wheel by a bearing or a bushing.

Preferably, the planet gear carrier of the toothless planetary gear mechanism is configured to transfer the motor provided driving force to the sprocket.

The toothless planetary gear mechanism may include a counterbalance member which is configured to counterbalance an imbalance of weight caused by the offsetting of the toothless planet gear with respect to the axis of rotation of the motor shaft.

Preferably, the toothless planetary gear mechanism does not include a weighted counterbalance member, but comprises first and second identical toothless planet gears arranged half a revolution out of phase with each other such that said first and second toothless planet gears counterbalance each other on rotation.

Preferably, the first and second toothless planet gears are located for rotation half a revolution out of phase with each other within a common, single toothless internal ring gear. Each of the first and second toothless planet gears may be supportably mounted on respective first and second eccentric wheels.

The toothless planet gear may be rotatably supported on the eccentric wheel with its axis of rotation offset by a predetermined amount with respect to the axis of rotation of the motor shaft and located within the toothless internal ring gear to engage a toothless inner ring gear surface by heating the toothless internal ring gear and shrink fitting it over the toothless planet gear.

Preferably, the first and second toothless planet gears are rotatably supported respectively on the first and second eccentric wheels with their axes of rotation offset by a predetermined amount with respect to the axis of rotation of the motor shaft and located within a common, single toothless internal ring gear for rotation half a revolution out of phase with each other to engage a toothless inner ring gear surface by heating the toothless internal ring gear and shrink fitting it over the first and second toothless planet gears.

Preferably, a one way drive means is provided between the motor shaft and the sprocket such that when the sprocket is being driven by a manually provided driving force through pedals of the pedal driven apparatus, the motor shaft is not caused to rotate.

In a sixth main aspect of the invention, there is provided a sprocket assembly for a pedal driven apparatus, comprising: a sprocket; first means for mechanically coupling the sprocket to a pedal driven pedal spindle; and second means for mechanically coupling the sprocket to an output shaft of a motor, wherein the first mechanical coupling means includes a first one way drive means coupling the pedal spindle and the sprocket such that the first one way drive means transfers a manually provided driving force applied to the pedals of the pedal driven apparatus to the sprocket to cause rotation of the sprocket and allows the pedal spindle to freewheel when the sprocket is being driven by the motor output shaft.

Preferably, the second mechanical coupling means is configured to mechanically couple the sprocket to the output shaft of the motor where the motor is arranged concentrically around the pedal spindle of the pedal driven apparatus such that the pedal spindle is freely accommodated through a hollow bore of the motor shaft and such that their axes of rotation are parallel.

Preferable, the second mechanical coupling means comprises a gear mechanism mechanically coupling the motor output shaft to the sprocket, wherein the gear mechanism has a reduction gear ratio and operates to transfer a motor provided driving force from the motor output shaft to the sprocket at said reduction gear ratio. The gear mechanism preferably comprises a planetary gear mechanism having a planet gear whose axis of rotation is offset by a predetermined amount with respect to the axis of rotation of the motor output shaft.

Preferably, the planet gear is rotatably supported on an eccentric wheel whereby the planet gear is made to rotate as the eccentric wheel rotates and whereby the position of the axis of rotation of the planet gear changes relative to the axis of rotation of the motor output shaft as the planet gear rotates such that the varying position of the axis of rotation of the planet gear defines a circle centred on the axis of rotation of the motor output shaft, said circle having a radius equal to the predetermined offset amount.

A planet gear carrier of the planetary gear mechanism may be configured to transfer the motor provided driving force to the sprocket. The planet gear carrier may be affixed to the sprocket for rotation therewith. The planet gear carrier may also be affixed to an output member of the first one way drive means for rotation therewith, whereby the manually provided driving force applied to the pedals is transferred to the motor output shaft through the planetary gear mechanism as well as to the sprocket.

Preferably, the second mechanical coupling means includes a second one way drive means coupling the motor output shaft and the sprocket such that when the sprocket is being driven by a manually provided driving force applied to the pedals of the pedal driven apparatus, the motor shaft is not caused to rotate. The second one way drive means may comprise at least one ratchet member moveably disposed on the planet gear carrier and arranged to engage a rack of a ratchet wheel fixed to rotate with the sprocket.

BRIEF DESCRIPTION OF THE DRAWINGS

The foregoing and further features of the present invention will be apparent from the following description of preferred embodiments which are provided by way of example only in connection with the accompanying figures, of which:

FIG. 15a is a first cross-sectional view of planet gear/one way ratchet in a sixth embodiment of a motor and sprocket assembly for a pedal driven apparatus according to the invention;

FIG. 15b is a second cross-sectional view of planet gear/one way ratchet from in the embodiment in FIG. 15a;

FIG. 15c is a cross-sectional view of the bearing and eccentric gear configuration in the embodiment in FIG. 15a;

FIG. 18 is an exploded perspective view of a motor structure of the embodiment in FIG. 17.

DETAILED DESCRIPTION OF PREFERRED EMBODIMENTS

Figure 1:
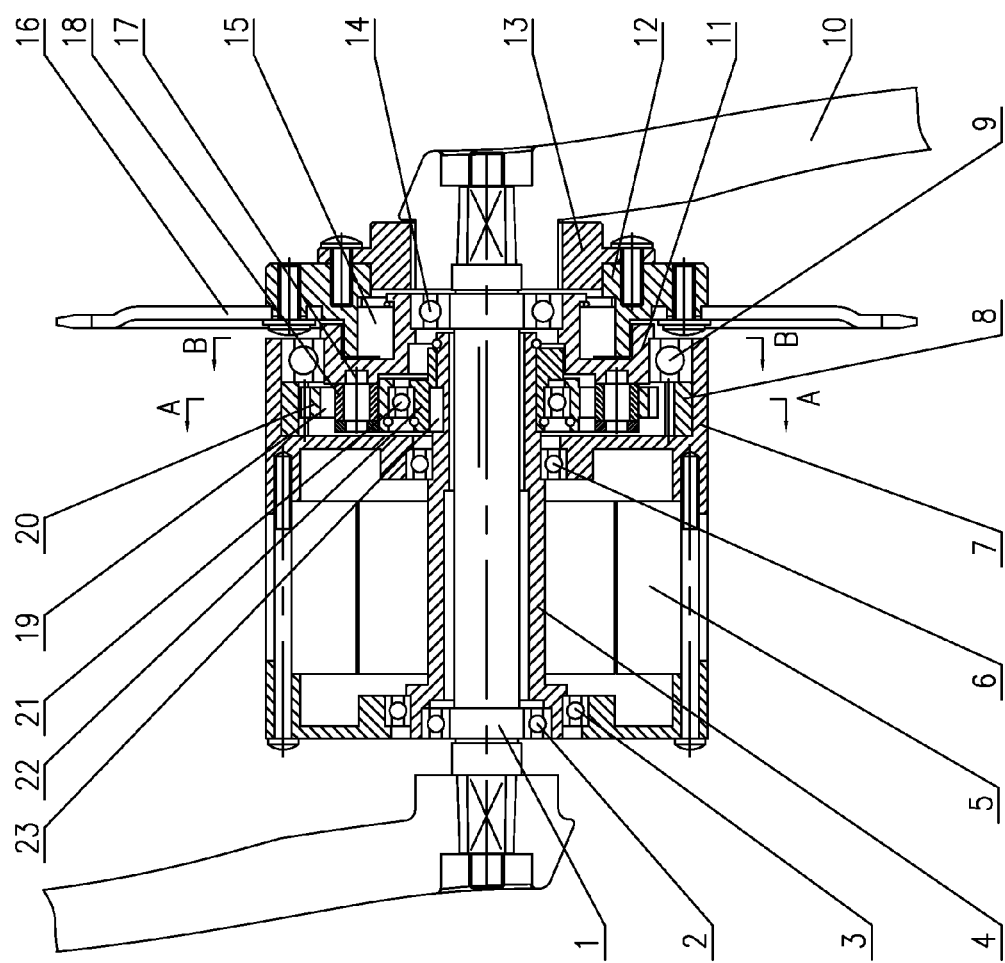
FIG. 1 is a structural schematic view of a first embodiment of a motor and sprocket assembly for a pedal driven apparatus according to the invention.
Figure 2:
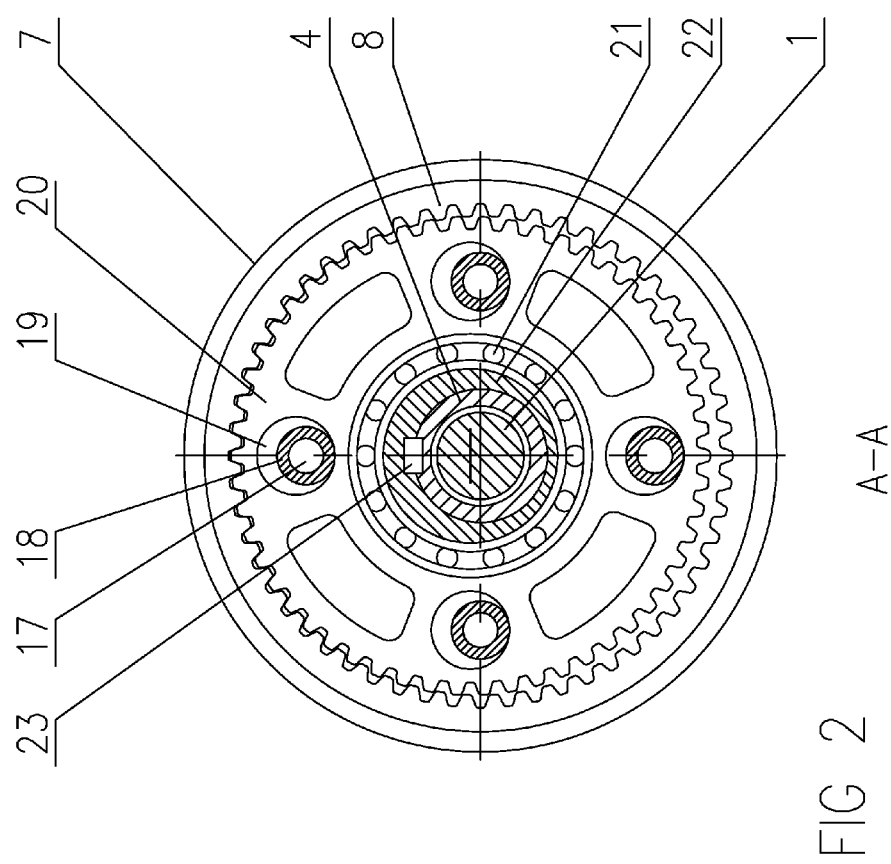
FIG. 2 is a sectional view taken along the line A-A of FIG. 1.
Figure 3:
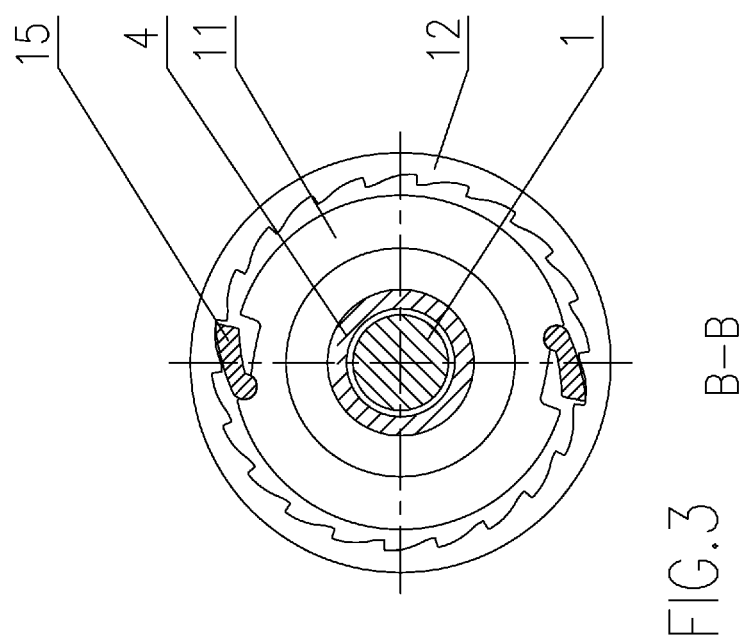
FIG. 3 is an enlarged sectional view taken along the line B-B of FIG. 1.
Figure 4:
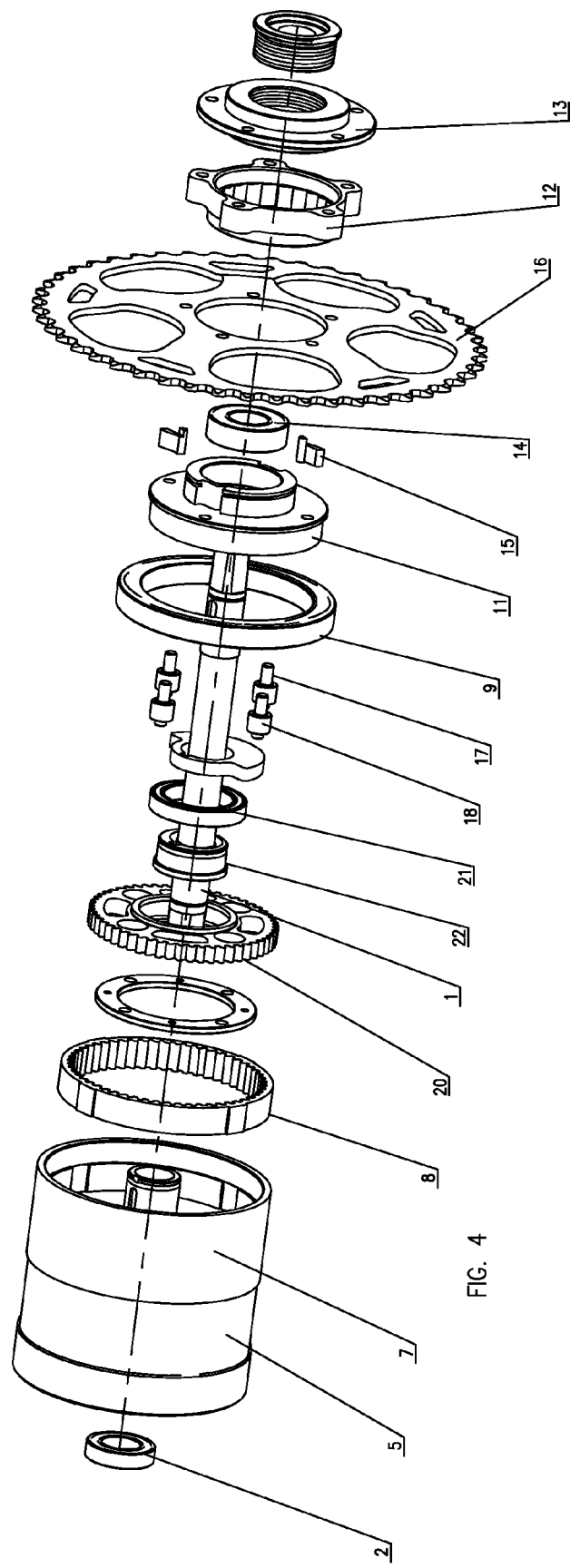
FIG. 4 is an exploded perspective view of the embodiment of FIG. 1.

The invention primarily concerns motorized bicycles, although the invention is applicable to any hybrid apparatus having pedals to provide a human power input and a motor to provide a mechanical power input. A motorized bicycle is a bicycle with an attached motor used to power the vehicle, or to assist with pedaling. Sometimes classified as a motor vehicle, or a class of hybrid vehicle, motorized bicycles may be powered by different types of engines. Motorized bicycles are distinguished from motorcycles by being capable of being powered by pedals alone if required. The actual usage of the pedals varies widely according to the type of vehicle. Some can be propelled by the motor alone if the rider chooses not to pedal. Those known as power-assist bikes have the pedals as the main form of propulsion with the motor used to give a bit of extra power, especially uphill. Many motorized bicycles are based on standard bicycle frame designs and technologies.

In a parallel hybrid motorized bicycle, human and motor inputs are mechanically coupled either in the bottom bracket, the rear or the front wheel, whereas in a (mechanical) series hybrid cycle, the human and motor inputs are coupled through differential gearing. In a (electronic) series hybrid cycle, human power is converted into electricity and is fed directly into the motor and mostly additional electricity is supplied from a battery.

"Pedelec" is a European term that generally refers to an electric bicycle that incorporates a torque and/or a speed sensor and/or a power controller that delivers a proportionate level of assist and only runs when the rider pedals.

The present invention is applicable to all of the above forms of bicycle having both a motor unit and pedals, but where the motor is arranged in close proximity to the sprocket assembly, preferably with the motor being arranged concentrically with the pedal spindle such that the pedal spindle is accommodated within a hollow shaft of the motor.

It is to be understood in the following description that the terms "sprocket" or "drive sprocket" are to be taken to mean any rotational component capable of transferring a driving force to another rotational component and includes, but is not limited to, toothed sprockets for engaging drive chains, belt pulleys for engaging drive belts, or gear wheels for engaging other gear wheels or gear trains.

In the following description, reference will be made to a bicycle as an example of a pedal driven apparatus, but it will be understood that the invention is not limited to bicycles and the following description is equally applicable to other types of pedal driven apparatuses such as tricycles, pedalos (pedal boat), or the like.

Referring to FIGS. 1 to 4, shown is a first embodiment of a motor and sprocket assembly according to the invention. A bicycle having said motor and sprocket assembly comprises manually operable pedals 10 fixed for rotation with a pedal spindle 1 for receiving a manually provided driving force and a motor 5 having a shaft 4 for receiving a motor provided driving force. A first torque transmission path is provided for transferring the manually provided driving force to a sprocket 16 of the pedal driven apparatus and a second torque transmission path is provided for transferring the motor provided driving force to said sprocket 16 of the pedal driven apparatus. A first one way drive means 13 is provided in the first torque transmission path between the pedal spindle 1 and the sprocket 16 such that, when the sprocket is being driven by the motor provided driving force through the second torque transmission path, the pedal spindle 1 is able to freewheel.

An advantage of this arrangement is that it is not necessary to provide a freewheel sprocket on the rear wheel of the bicycle. This is because the first one way drive means 13 provides this function in addition to enabling the pedal spindle 1 to freewheel when the motor drive is operating.

The first torque transmission path comprises the manually operable pedals 10, the pedal spindle 1 to which the pedals 10 are affixed for rotation therewith, and the first one way drive means 13. The first one way drive means 13 mechanically couples the pedal spindle 1 to the sprocket 16 such that the first one way drive means 13 transfers the manually provided driving force applied to the pedals 10 to the sprocket 16 to cause rotation of the sprocket. The first one way drive means 13 also allows the pedal spindle 1 to freewheel when the sprocket 16 is being driven by the motor shaft 4. The first one way drive means 13 may comprise a freewheel device such as an over-running bearing or an over-running clutch or any device suitable for enabling drive to be applied through an output member of the one way drive means, but for an input member to freewheel when no drive is being transferred through said first one way drive means 13.

The second torque transmission path comprises the motor shaft 4 and a gear mechanism housed in a casing 7 mechanically coupling the motor shaft 4 to the sprocket 16. The gear mechanism has a reduction gear ratio and operates to transfer the motor provided driving force from the motor shaft 4 to the sprocket 16 at said reduction gear ratio. The gear mechanism may comprise a planetary gear mechanism having a planet gear 20 whose axis of rotation is offset by a predetermined amount with respect to the axis of rotation of the motor shaft 4.

This allows a high speed motor to be employed whereby the gear mechanism applies a suitable reduction gear ratio to the output shaft of the motor to rotate the sprocket at high torque and low speed (relatively speaking when compared to the motor shaft speed of rotation).

As shown more explicitly in FIGS. 1 to 4, the motor and sprocket assembly comprises: the motor 5, the motor rotor hollow shaft 4 supported by bearings 3 and 6, an end cover at one end of the motor 5, i.e. the casing 7 of the planetary gear mechanism, an internal gear ring 8 fixed within the casing 7 of the planetary gear mechanism; an eccentric wheel 22 fixed around the hollow shaft 4 of the motor 5, and a flat key 23 disposed between the hollow shaft 4 and the eccentric wheel 22 for transmitting torque. The planet gear 20 is fit around the outer circumference of the eccentric wheel 22 by means of a bearing 21, for rotation with the eccentric wheel 22, and engaged with the teeth of the internal gear ring 8. Four circular holes 19 are provided on a side surface of the planet gear 20. A planet gear carrier 11 is supported within the casing 7 by means of a bearing 9, and is provided with four pins 17 on a side surface facing the planet gear 20. Bushings 18 are provided around the pins 17 and inserted into the four circular holes 19 on the side surface of the planet gear 20. The function of the four pins 17 and the bushings 18 inserted into the four circular holes 19 on the planet gear 11 is to transfer drive from the planet gear 20 to the planet gear carrier 11 as the planet gear 20 rotates. The bushings 18 revolve around the pins 17 to accommodate rotation of the planet gear 20. The holes have a diameter larger than the diameter of the pins 17 to accommodate eccentric movement of the planet gear 20 with respect to the axis of rotation of the motor shaft 4.

To effect the transfer of a motor driving force from the planet gear 20 to the planet gear carrier 11, ratchet seats are arranged on an outer side of the planet gear carrier 11 and ratchets 15 moveably disposed on the ratchet seats and engaged with an inner surface of a ratchet wheel 12 which is affixed to the sprocket 16. The pedal central spindle 1 is freely disposed in the hollow shaft 4 of the motor 5 and is mounted coaxially with the motor shaft 4. The pedal central spindle 1 is supported in the hollow shaft 4 of the motor and the planet gear carrier 11 by means of bearings 2 and 14 respectively. The pedal cranks 10 are disposed at the ends of the pedal central spindle 1. Associated with the pedal crank 10 on a sprocket side of the assembly is the first one way drive means comprising a one-way freewheel 13 fixed on said pedal crank 10. A side surface of the ratchet wheel 12 is fixed on a flange of the one-way freewheel 13, and the sprocket 16 is fixed on the other side surface of the ratchet wheel 12.

In operation of this embodiment, during pedal driving, the pedal crank 10 drives the ratchet wheel 12 to rotate through the one-way freewheel 13, so that the sprocket 16 fixed on the ratchet wheel 12 rotates simultaneously, and propels the bicycle to move forward through a chain drive (not shown) of the sprocket 16.

A second one way drive means comprising the ratchet members 15 and the ratchet wheel 12 is provided in the second torque transmission path between the motor shaft 4 and the sprocket 16 such that, when the sprocket 16 is being driven by the manually provided driving force through the first torque transmission path, the motor shaft 4 is not caused to rotate. The ratchet members 15 moveably disposed on the planet gear carrier 11 engage a rack of the ratchet wheel 12. The ratchet members 15 may have associated therewith means (not shown) for resiliently biasing free ends of said ratchet members 15 outwardly from a surface of the planet gear carrier 11 such that said free ends of the ratchet members 15 engage teeth in the rack of the ratchet wheel 12.

Because of the one-way transmitting function of the second one-way drive means 12, 15, the rotation of the ratchet wheel 12 by the pedal 10 will not drive the planet gear carrier 11 or the motor shaft 4 to rotate. During motor driving, the hollow shaft 4 of the motor rotates the eccentric wheel 22 of the planetary gear mechanism, and then the eccentric wheel 22 drives the planet gear 20 to revolve around the motor axis. According to the angular position of the eccentric 22 at any time during rotation, the teeth of the planet gear 20 engage with the corresponding teeth of the internal gear ring 18, so as to make the planet gear 20 rotate in relation to the motor axis and this rotation will be outputted by the planet gear carrier 11. The planet gear carrier 11 rotates the ratchet wheel 12 by means of the ratchets 15 disposed on the ratchet seats, and then the ratchet wheel 12 rotates the sprocket 16 which is fixed together with the ratchet wheel 12, so as to propel the bicycle to move forward by the chain. At this time, because of the one-way transmitting function of the first one-way transmitting means, (i.e. the one-way freewheel 13), the rotation of the sprocket 16 will not make the pedal crank 10 or the pedal spindle 1 rotate.

In this embodiment, the motor 5 is arranged concentrically around the pedal spindle 1 such that the pedal spindle 1 is freely accommodated through the hollow bore of the motor shaft 4 and such that their axes of rotation are parallel and preferably coaxial, i.e. the pedal spindle 1 and the motor shaft 4 share the same axis of rotation.

This arrangement results in a neat and compact integration of the motor with the pedal spindle and sprocket assembly.

Also in this embodiment, the planet gear 20 is rotatably supported on the eccentric wheel 22 whereby the planet gear 20 is made to rotate as the eccentric wheel 22 rotates and whereby the position of the axis of rotation of the planet gear 20 changes relative to the axis of rotation of the motor shaft 4 as the planet gear 20 rotates such that the varying position of the axis of rotation of the planet gear 20 defines a circle centred on the axis of rotation of the motor shaft 1, said circle having a radius equal to the predetermined offset amount. The planet gear 20 has a smaller diameter than the internal ring gear 8, the internal ring gear 8 having a central axis coincident with the axis of rotation of the motor shaft 4. The planet gear 20 has a smaller number of teeth than the internal ring gear 8.

The planet gear 20 rotates around the inner toothed surface of the inner ring gear 8 such that the outer toothed surface of the planet gear 20 meshes with only a small number of teeth of the inner ring gear 8 at any point of time.

The planet gear carrier 11 of the planetary gear mechanism transfers the motor provided driving force to the sprocket 16 and, in doing so, provides a neat and efficient way of mechanically transferring the motor driving force to the sprocket 16.

The planetary gear mechanism includes a counterbalance member 24 which is configured to counterbalance an imbalance of weight caused by the offsetting of the planet gear 20 with respect to the axis of rotation of the motor shaft 4. The counterbalance member 24 comprises a generally semi-circular weighted member which is arranged to rotate with the planet gear 20 so as to counterbalance the planet gear when the planet gear is rotating.

The motor 5 comprises an electric motor powered by a battery pack carried on the pedal driven apparatus.

Figure 5:
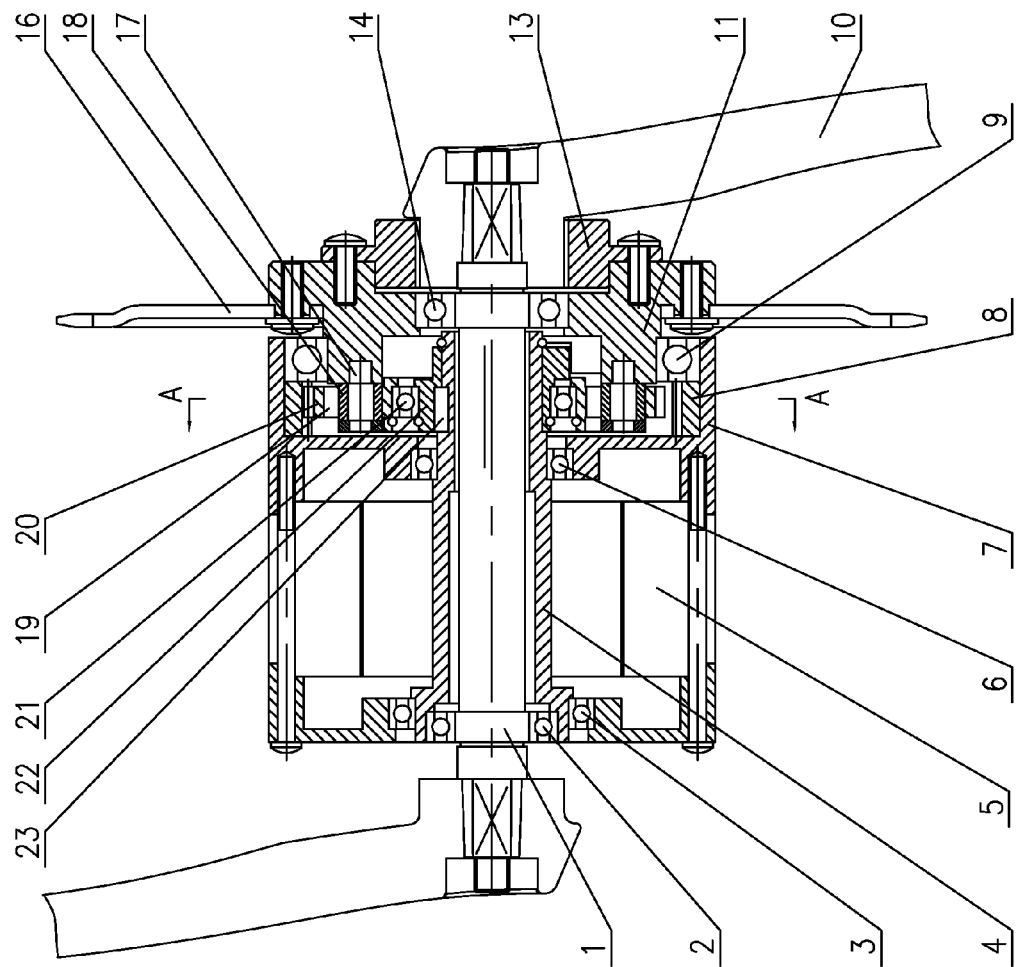
FIG. 5 is a structural schematic view of a second embodiment of a motor and sprocket assembly for a pedal driven apparatus according to the invention.

FIG. 5 depicts a second embodiment of the motor and sprocket assembly according to the invention. In the description of this embodiment, like numerals to those used in FIGS. 1 to 4 are used to denote like parts, although any differences in the parts are described in the following.

In this embodiment, the second one-way drive or transmitting means, (i.e. the ratchet wheel 12 and ratchets 15), is omitted, so that the planet gear carrier 11' of the planetary gear mechanism is fixedly coupled to the sprocket 16 for rotation therewith. The planet gear 20 and the sprocket 16 are directly and fixedly connected with the (output member of) one-way freewheel 13 of the first one-way drive/transmitting means. As such, the planet gear carrier 11' is modified compared to its configuration in the first embodiment of FIGS. 1 to 4 to enable it to be directly and fixedly connected with the one-way freewheel 13. In this embodiment, the direct coupling of the planet gear carrier 11' to the freewheel 13 enables the bicycle function to be altered. In this embodiment, the motor 5 can function as a power generating device driven by pedaling or forward motion of the bicycle, i.e. the bicycle freewheeling down a slope, for example.

In operation of this embodiment, during pedal driving, the pedal crank 10 drives the planet gear carrier 11' and the sprocket 16 to rotate simultaneously through the one-way freewheel 13, and then propels the bicycle to move forward through the chain. At this time, since the planet gear carrier 11' rotates along with the sprocket 16, it drives the planet gear 20 and the eccentric wheel 22 to rotate, which in turn drives the hollow shaft 4 of the motor 5 to rotate. Under this circumstance, if the rider intends to increase the load applied on the pedals to do exercise using the bicycle, or intends to use the motor to function as a brake for decelerating the bicycle when going downhill or to use the motor to generate power for lights or recharging the motor battery pack, the rider can control a switch installed on, for example, a handlebar of the bicycle to switch the circuit of a controller so as to transform the motor 5 to a power generating device, the power generated by which can be utilized by a load or for charging a battery. During normal riding, the controller can be switched to be in a normal riding state, so that no additional load is applied on pedals. During motor driving, the hollow shaft 4 of the motor 5 drives the eccentric wheel 22 of the planetary gear mechanism to rotate, which in turn drives the planet gear 20 to revolve around the axis of the motor. Consequently, torque will be outputted by the planet gear carrier 11' which drives the sprocket 16 to rotate, and then propels the bicycle to move forward through the chain drive. At this time, due to the one-way transmitting function of the one-way freewheel 13, the rotation of the sprocket will not drive the pedal crank 10 to rotate, i.e. the pedal crank and the pedal spindle can freewheel.

In this example, when moving forward, the bicycle can drive the motor to generate power through the transference of power transferring from the chain drive, whilst no one-way freewheel having the one-way drive/transmitting function is provided at the rear wheel hub.

Figure 6:
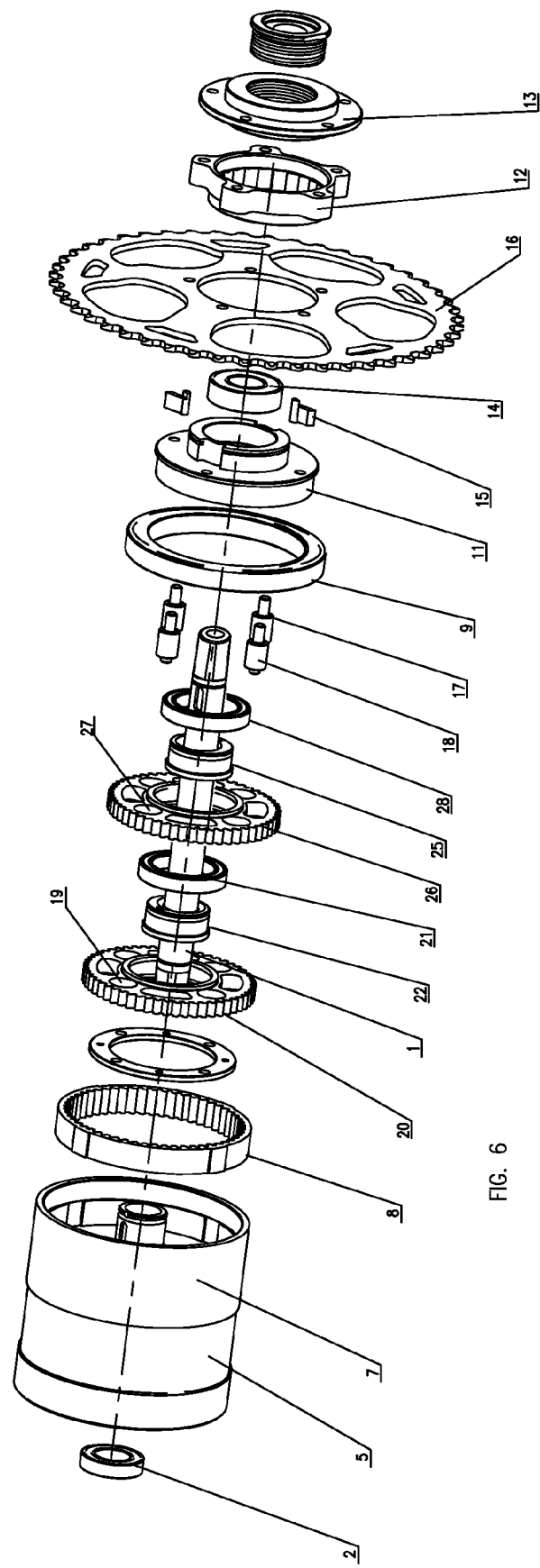
FIG. 6 is an exploded perspective view of a third embodiment of a motor and sprocket assembly for a pedal driven apparatus according to the invention.

FIG. 6 depicts a third embodiment of the motor and sprocket assembly according to the invention. In the description of this embodiment, like numerals to those used in FIGS. 1 to 5 are used to denote like parts, although any differences in the parts are described in the following.

In this embodiment, the planetary gear mechanism does not include a weighted counterbalance member, but comprises first and second identical planet gears 20, 26 arranged half a revolution out of phase with each other such that said first and second planet gears 20, 26 counterbalance each other on rotation. The first and second planet gears 20, 26 may be located within respective internal ring gears, but are preferably located for rotation half a revolution out of phase with each other within a common, single internal ring gear 8' of double width compared to the internal ring gear of the first or second embodiments. The first and second planet gears 20, 26 are supportably mounted on respective first and second eccentric wheels 22, 25. The second planet gear 26 is mounted on the second eccentric wheel 25 by a bearing 28. The pins 17 are made longer than in other embodiments and extend through respective sets of apertures 19, 27 in both of the planet gears 20, 26.

The use of two out of phase planet gears 20, 26 negates the need to provide a weighted counterbalance member and provides a balanced system which transfers motor driving force to the sprocket 16 more efficiently and quietly than the foregoing arrangement including a weighted counterbalance.

This embodiment in like manner to the second embodiment depicted by FIG. 5 includes a second one way drive means 12, 15. However, it will be understood that the described arrangement of first and second planet gears 20, 26 of this embodiment (FIG. 6) can be employed within either of the first (FIGS. 1 to 4) or second (FIG. 5) embodiments with minimal modification. Furthermore, the operation of this embodiment is otherwise the same in all respects to the second embodiment save for the fact that counterbalancing of the (first) planet gear 20 is provided by the second planet gear 26.

In the foregoing embodiments of the invention, the teeth on the gears of the planetary gear mechanism are depicted as comprising spur or straight cut gears in which the edge of each tooth is straight and aligned parallel to the axis of rotation of the gear. However, in preferred embodiments, the gears comprise helical gears.

Helical gears offer a refinement over spur gears. The leading edges of the teeth are not parallel to the axis of rotation, but are set at an angle to said axis of rotation of the gear. Since the gear is curved, this angling causes the tooth shape to be a segment of a helix. The angled teeth engage more gradually than do spur gear teeth causing them to run more smoothly and quietly. With parallel helical gears, each pair of teeth first make contact at a single point at one side of the gear wheel; a moving curve of contact then grows gradually across the tooth face to a maximum then recedes until the teeth break contact at a single point on the opposite side. In spur gears teeth suddenly meet at a line contact across their entire width causing stress and noise. Spur gears make a characteristic whine at high speeds and can not take as much torque as helical gears. A disadvantage of helical gears is a resultant thrust along the axis of the gear, which normally needs to be accommodated by appropriate thrust bearings, but in the present invention, other components of the motor transmission system act to oppose any thrust along the axis of the gear caused by meshing helical gears and so thrust bearings may not be necessary in some embodiments. In all other respects, the planetary gear mechanism having helical gears is the same as the embodiments of the planetary gear mechanism hereinbefore described.

Figure 7:
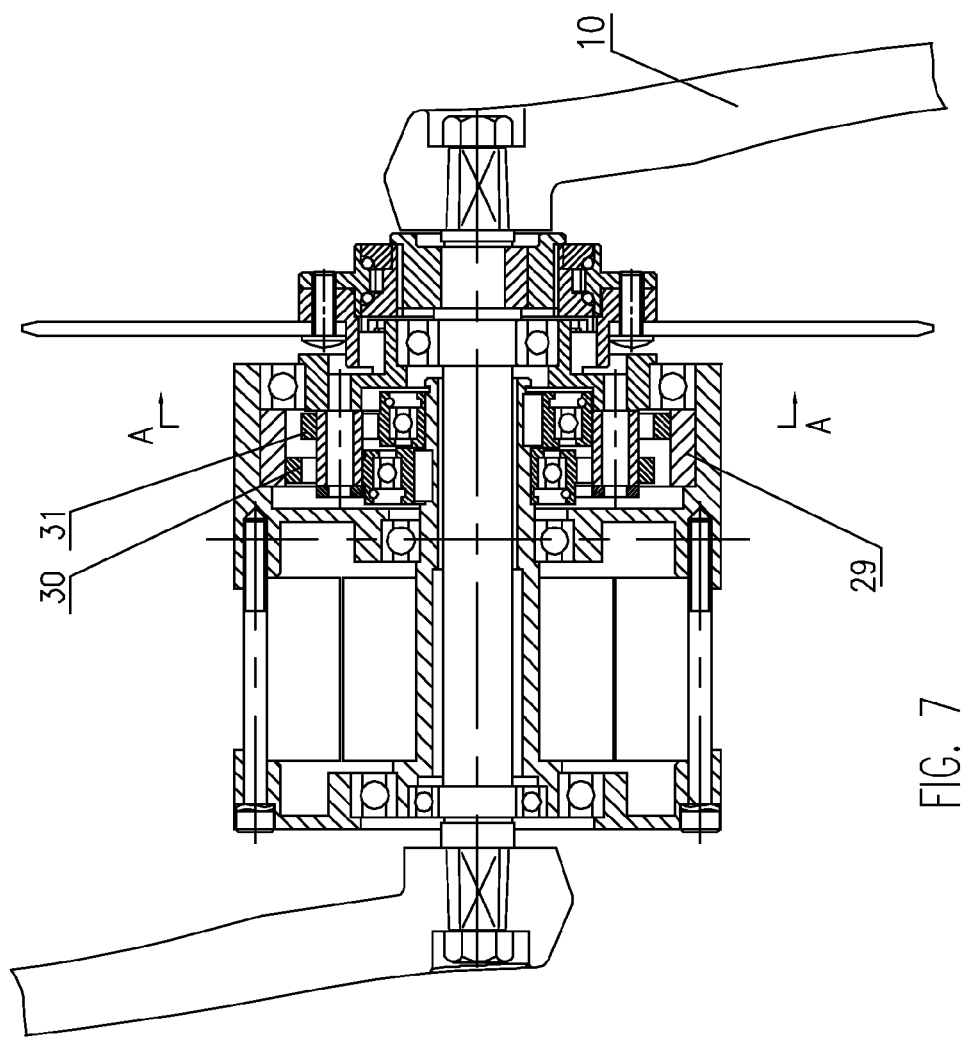
FIG. 7 is a structural schematic view of a fourth embodiment of a motor and sprocket assembly for a pedal driven apparatus according to the invention.
Figure 8:
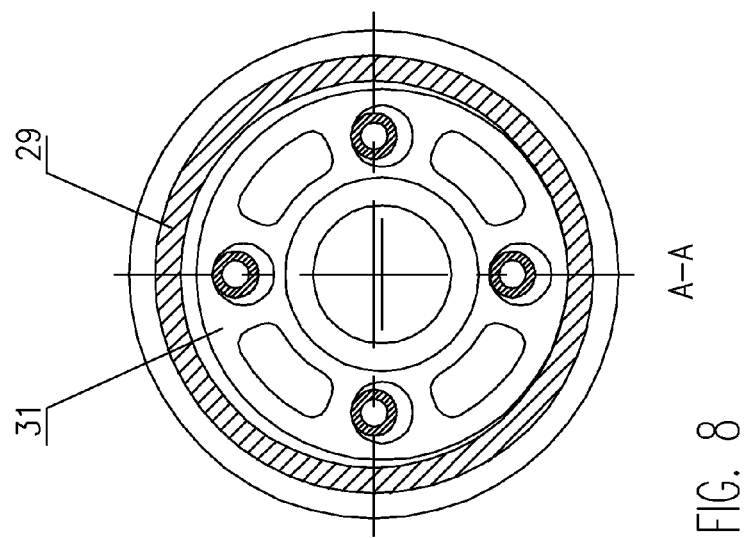
FIG. 8 is a sectional view taken along the line A-A of FIG. 7.
Figure 9:
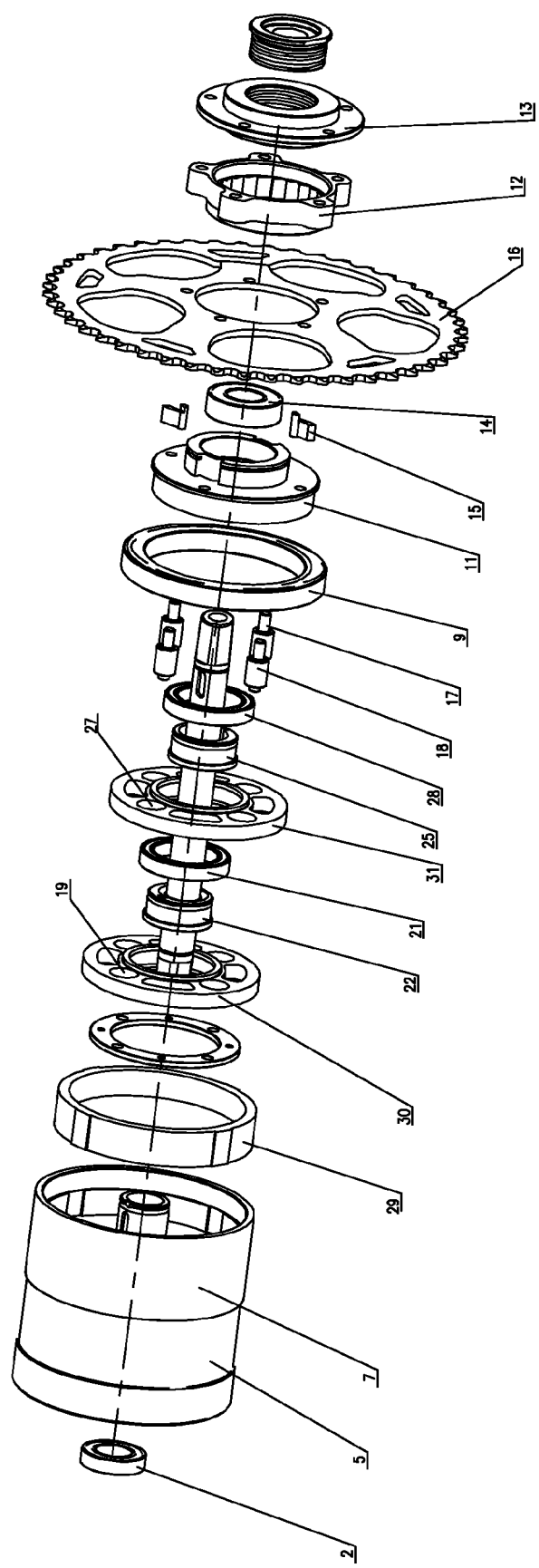
FIG. 9 is an exploded perspective view of the embodiment of FIG. 7.

FIGS. 7 to 9 depict a fourth embodiment of the motor and sprocket assembly according to the invention. In the description of this embodiment, like numerals to those used in FIGS. 1 to 6 are used to denote like parts, although any differences in the parts are described in the following.

In this embodiment, the arrangement of components is generally identical to that of the third embodiment save for the gear mechanism comprising a toothless planetary gear mechanism.

The toothless planetary gear mechanism has first and second toothless planet gears 30, 31 whose axes of rotation are offset by a predetermined amount with respect to the axis of rotation of the motor shaft 4. The reduction gear ratio of the toothless planetary gear mechanism is defined by a relationship between the respective diameters of the toothless planet gears 30, 31 and a single, common toothless internal ring gear 29 within which the first and second planet gears 30, 31 are located for rotation. The toothless planet gears 30, 31 have smaller diameters than the toothless internal ring gear 29. The first and second toothless planet gears 30, 31 are rotatably supported respectively on first and second eccentric wheels 22, 25 and located within the common, single toothless internal ring gear 29 half a revolution out of phase with each other to each counterbalance the other. The second planet gear 31 is mounted on the second eccentric wheel 25 by a bearing 28. The pins 17 are made longer than in other embodiments and extend through respective sets of apertures 19, 27 in both of the planet gears 30, 31. Outer surfaces of the first and second planet gears 30, 31 engage an inner surface of the toothless inner ring gear 29. The inner surface of the internal ring gear and/or the outer surfaces of the planet gears 30, 31 may be roughened to enhance the coefficient of friction acting between said engaged surfaces at their lines of contact. The friction fit between the first and second planet gears 30, 31 and the toothless internal ring gear 29 is achieved by heating the toothless internal ring gear 29 and shrink fitting it over the first and second toothless planet gears 30, 31.

One advantage of a toothless planetary gear mechanism is quietness. The lack of gear teeth and the reliance on contact between generally smooth, although possibly roughened, surfaces to effect a transfer of power from the motor to the sprocket results in very quiet operation and more efficient power transfer as there is no slippage or chatter between gear teeth as can occur in toothed gear mechanisms.

It will be understood that this embodiment could be modified to provide only a single toothless planet gear in a similar manner to the first embodiment depicted by FIGS. 1 to 4. In such a case, the toothless planetary gear mechanism would include a counterbalance member configured to counterbalance an imbalance of weight caused by the offsetting of the toothless planet gear with respect to the axis of rotation of the motor shaft.

It will also be appreciated that, whilst this embodiment includes a second one way drive means 12, 15 in a similar manner to the first and third embodiments, it could be modified in a similar manner to the second embodiment to omit the second one way drive means and directly and fixedly couple the planet gear carrier 11 to the first one way drive means 13. In such case, the planet gear carrier 11 may be affixed to an output member of the first one way drive means 13 for rotation therewith, whereby the manually provided driving force applied to the pedals 10 is transferred via the first torque transmission path to the motor shaft 4 through the toothless planetary gear mechanism as well as to the sprocket 16.

FIGS. 11 to 14 depict a fifth embodiment of the motor and sprocket assembly according to the invention. In the description of this embodiment, like numerals to those used in FIGS. 1 to 9 are used to denote like parts, although any differences in the parts are described in the following.

In this embodiment, the arrangement of components is generally identical to that of the first embodiment save for the second one way transmission means in the second torque transmission path between the motor shaft and the sprocket of the pedal driven apparatus.

In the first embodiment as described above, the second one way transmission means contain ratchet members moveably disposed on the planet gear carrier of the planet gear mechanism, where the motor provided driving force is transmitted to the ratchet wheel and in turn the sprocket by the engaging of the ratchet members of the planet gear mechanism with racks of the ratchet wheel. In comparison, in the fifth embodiment as shown in FIGS. 11-14 the planet gear carrier is eliminated from the second torque transmission path, but a first one way ratchet 60 and a floating carrier mechanism is now utilized to transmit the motor provided driving force from the planet gear 20 to the sprocket 16. The floating carrier mechanism includes a floating carrier 76 and an output flange 62. The first one way ratchet 60 is fixed onto the planet gear 20 to rotate together with the planet gear 20, and they are arranged to be concentric with each other. As the first one way ratchet 60 is arranged to be concentric with the planet gear 20, the first one way ratchet 60 has a ratchet axis co-incident with the axis of rotation of the planet gear 20.

Figure 12:
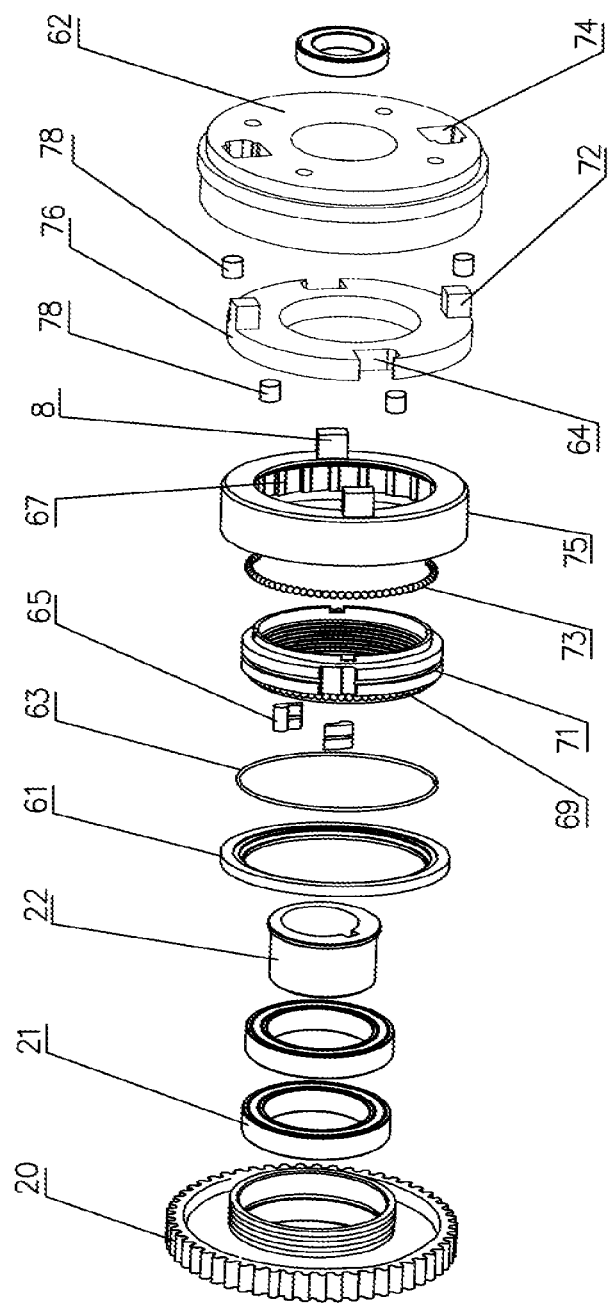
FIG. 12 is an exploded perspective view of a one way drive means of the embodiment in FIG. 11.
Figure 13:
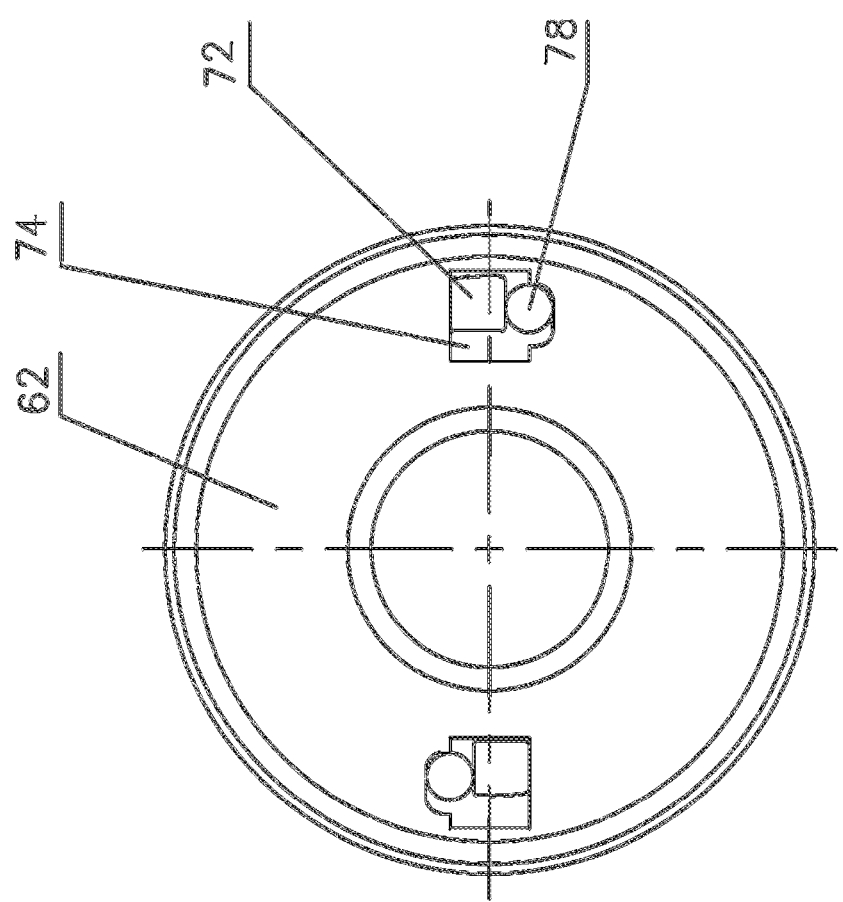
FIG. 13 is a cross-sectional view of an output flange in the embodiment of FIG. 11.
Figure 14:
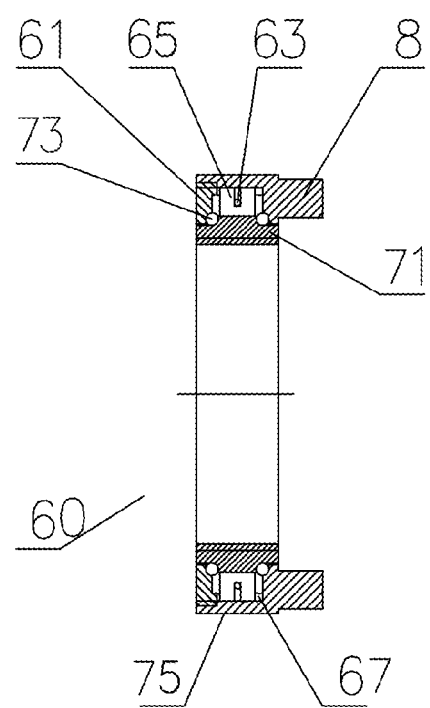
FIG. 14 is a cross-sectional view of a first one way ratchet in the embodiment of FIG. 11.

The first one way ratchet 60 as shown in FIGS. 11-14 is a ratchet wheel with a ratchet outer ring 75 for receiving the motor provided driving force from the planet gear 20 and a ratchet inner ring 71 that outputs the motor provided driving force. The ratchet outer ring 75 and the ratchet inner ring 71 are concentrically placed such that the ratchet outer ring 75 encompasses the ratchet inner ring 71. As it is best seen in FIGS. 12 and 14, there is a ring of balls 73 placed between the ratchet outer ring 75 and the ratchet inner ring 71 to provide support thereto, and the ratchet outer ring 75 and the ratchet inner ring 71 are capable of rotating with respect to each other. The ratchet inner ring 71 has a plurality of pawls 65 disposed on the outer circumference of the ratchet inner ring 71. In other words, the pawls 65 are disposed between the outer circumference of the ratchet inner ring 71 and the inner circumference of the ratchet outer ring 75. On the inner circumstance of the ratchet outer ring 75 there is arranged a plurality of teeth 67. The pawls 65 are adapted to engage with the continuous teeth 67 on the ratchet outer ring 75, similar to the ratchet introduced in the first embodiment. There is also a spring ring 63 arranged between the outer circumference of the ratchet inner ring 71 and the inner circumference of the ratchet outer ring 75. The spring ring 63 provides a resilient force to the pawls 65 to push them to engage the teeth 67.

It will be appreciated that in other implementations the first one way ratchet 60 can be any other type of ratchet device that achieves a similar effect of one way drive transmission.

The planet gear 20 in this embodiment is fit around the outer circumference of the eccentric wheel 22 by means of a bearing 21, which is similar to that of the first embodiment described above. The floating carrier 76 is moveably coupled to the first one way ratchet 60 on one side of the floating carrier 76, and on the other side of the floating carrier 76 it is moveably coupled to the output flange 62. In other words, the floating carrier 76 is positioned between the first one way ratchet 60 and the output flange 62. The output flange 62 is mechanically coupled to the sprocket 16 of the pedal driven apparatus. Preferably, the output flange is fixed onto the sprocket 16 via a connecting disk 70, which is also used for fixing the first one way drive means in the first torque transmission path.

The floating carrier 76 is movably coupled to the first one way ratchet 60 as well to the output flange 62 using a block-slot configuration which is best seen in FIGS. 12 and 13. On a side surface of the first one way ratchet 60, there is arranged one or more blocks 66 which are in a cubic or rectangular shape. Preferably, the number of blocks 66 disposed on the first one way ratchet 60 is two. Note that the blocks 66 are disposed on the surface of the ratchet inner ring of the first one way ratchet 60, and therefore the rotation of the blocks 66 with the ratchet inner ring around the ratchet axis may be independent from the rotation of the ratchet outer ring due to one way transmission characteristics of the first one way ratchet 60. On a corresponding surface of the floating carrier 76 facing the first one way ratchet 60, there is provided one or more slots 64. Each block 66 on the first one way ratchet 60 one-to-one corresponds to a slot 64 on the floating carrier 76 such that each of the one or more blocks 66 is adapted to be received and confined by a corresponding slot 64. As a result, the floating carrier 76 is driven to rotate by a rotation of the first one way ratchet 60 via a transfer of the motor provided driving force between the one or more blocks 66 of the first one way ratchet 60 and the one or more slots 64 of the floating carrier 76.

Similarly, on a side surface of the floating carrier 76 facing the output flange 62, there is arranged one or more blocks 72 which are in a cubic or rectangular shape. Preferably, the number of blocks 72 disposed on the floating carrier 76 is also two. On a corresponding surface of the output flange 62 facing the floating carrier 76, there is provided one or more slots 74. Each block 72 on the floating carrier 76 one-to-one corresponds to a slot 74 on the output flange 62 such that each of the one or more blocks 72 is adapted to be received and confined by a corresponding slot 74. As a result, the output flange 62 is driven to rotate by a rotation of the floating carrier 76 via a transfer of the motor provided driving force between the one or more blocks 72 of the floating carrier 76 and the one or more slots 74 of the output flange 62.

One can see that block-slot configuration on the first one way ratchet 60, floating carrier 76 and output flange 62, as described herein, is similar to the pins and circular holes configuration in the planet gear and the planet gear carrier in the first embodiment described previously. The function of the blocks 66 and 72 inserted into the slots 64 on the floating carrier 76 and slots on the output flange 62 respectively, is to transfer the motor provided driving force from the first one way ratchet 60 to the floating carrier 76 and then to the output flange 62 as the planet gear 20 rotates. The slots 64 and 74 have a dimension larger than that of the blocks 66 and 72 respectively, in order to accommodate eccentric movement of the first one way ratchet 60 with respect to the axis of rotation of the motor shaft 4. Preferably, the slots 64 on the floating carrier 76 have an elongated shape and are formed at the outer circumference of the floating carrier 76 in a substantially tangential line direction of the circumference of the floating carrier 76. As shown in FIG. 12, the slots 64 as well as the blocks 66 are equally distributed along the circumferences of the first one way ratchet 60 and the floating carrier 76 respectively. Preferably, the slots 74 on the output flange 62 have a substantially square shape which has a length or width larger than the diameter of the blocks 72 received in the slots 74. The shape of the slots 74 is best shown in FIG. 13. The slots 74 as well as the blocks 72 are equally distributed along the circumferences of the first one way ratchet 60 and the floating carrier 76 respectively.

Preferably, as shown in FIGS. 12 and 13, the floating carrier mechanism of the pedal driven apparatus in this embodiment further includes one or more rollers 78 each corresponding to one of the one or more blocks 66 or 72 and a corresponding one of the one or more slots 64 or 74. Each roller 78 is adapted to fit in-between its corresponding block 66 or 72 and an end face of the corresponding slot 64 or 74.

In operation of the pedal driving apparatus of this embodiment, when the motor 5 starts to output the motor provided driving force by the motor shaft 4, the eccentric wheel 22 fixed around the hollow shaft 4 of the motor is driven to rotate around the axis of rotation of the motor shaft 4. Then, the eccentric wheel 22 drives the planet gear 20 to revolve around the motor axis. According to the angular position of the eccentric 22 at any time during rotation, the teeth of the planet gear 20 engage with the corresponding teeth of the internal gear ring, so as to make the planet gear 20 rotate in relation to the motor axis. At the same time, the planet gear 20 revolves with respect to its bearing 21. By the combined effect of rotation and revolving of the planet gear 20, the first one way ratchet 60 fixed onto the planet gear 20 rotates eccentrically to the motor axis and swings due to the shape of the eccentric wheel 22. The position of the axis of rotation of the planet gear 20 as well as the position of the ratchet axis of the first one way ratchet 60 change relative to the axis of rotation of the motor shaft 4 as the planet gear 20 and the first one way ratchet 60 rotate, such that the varying positions of the axis of rotation of the planet gear 20 and the ratchet axis of the first one way ratchet 60 define a circle centred on the axis of rotation of the motor shaft 4. This circle has a radius equal to a predetermined offset amount. Therefore, the planet gear 20 as well as the first one way ratchet 60 has an axis of rotation which is offset by a predetermined amount with respect to an axis of rotation of the motor shaft 4. In other words, the second one way drive means in this embodiment has an axis of rotation offset by a predetermined amount with respect to an axis of rotation of said motor shaft 4.

As the first one way ratchet 60 rotates, the motor provided driving force is transferred from the first one way ratchet 60 to the floating carrier 76 via the blocks 66 on the first one way ratchet 60, the rollers 78, and the slots 64 on the floating carrier 76. Similarly, the rotation of the floating carrier 76, by the interaction between the blocks 72 on the floating carrier 76, the rollers 78, and the slots 74 on the output flange 62, drives the output flange 62 to rotate so that the motor provided driving force is transferred to the output flange 62 which is mechanically coupled to the sprocket 16. The sprocket 16 rotates simultaneously with the output flange 62, and propels the bicycle to move forward through a chain drive (not shown) of the sprocket 16.

Due to the presence of the first one way ratchet 60 in the second one way drive means, the rotation of the first one way ratchet 60 by the pedal 10 will not drive the planet gear 20 or the motor shaft 4 to rotate. In particular, when the ratchet inner ring 71 of the first one way ratchet 60 rotates in a forward direction, the ratchet outer ring 75 is driven to rotate due to the engagement of the pawls 65 and the teeth 67. However, when the ratchet outer ring 75 rotates in a forward direction, the pawls 65 leave the engagement with the teeth 67. As a result, the ratchet inner 71 is not driven to rotate.

In this embodiment, since the dimension of the slots 64 and 74 is larger than the dimension of the blocks 66 and 72 respectively, and also because the floating carrier 76 is only supported by the first one way ratchet 66 and output flange 62 but not by the motor casing, the eccentric movement of the first one way ratchet 60 is transformed to a rotation of the output flange 62 which is around the axis of the motor shaft 4 or the axis of the pedal spindle.

Due to the presence of the rollers 78 in the slots 64 or 74, a rolling friction instead of a sliding friction exists between each block 66 or 72 on the first one way ratchet 60 and the floating carrier 76 and a corresponding slot 64 or 74 on the floating carrier 76 and the output flange 62 respectively. This configuration effectively reduces abrasion of the relative components in the floating carrier mechanism and energy waste due to the heat generated by the sliding friction.

In one implementation, the first one way drive means of the pedal driven apparatus between the pedal spindle and the sprocket can also be implemented by using a second one way ratchet similar to the first one way ratchet 66 described above. This is in contrast to the use of the freewheel 13 as mentioned in the first embodiment above.

In alternative embodiments, the planet gear mechanism can be a toothless planet gear mechanism similar to those shown in FIGS. 7-9 and described in the fourth embodiment above, which includes a toothless planet gear and a toothless inner ring gear within which the toothless planet gear locates for rotation therewithin. The second one way drive means in these alternative embodiments, however, can be the same as the floating carrier mechanism described in the fifth embodiment.

Figure 16:
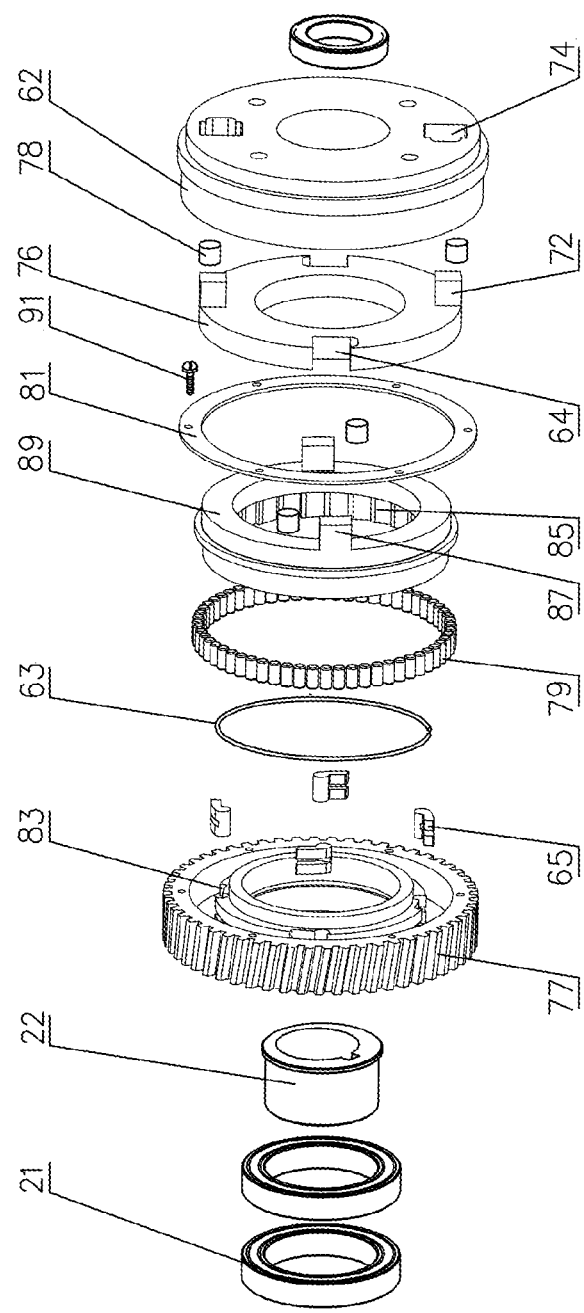
FIG. 16 is an exploded perspective view of a one way drive means of the embodiment in FIGS. 15a and 15b.

FIGS. 15a-16 depict a sixth embodiment of the motor and sprocket assembly according to the invention. In the description of this embodiment, like numerals to those used in FIGS. 1 to 14 are used to denote like parts, although any differences in the parts are described in the following.

In this embodiment, the arrangement of components is generally identical to that of the fifth embodiment as shown in FIGS. 11-14 except for the configuration of the planet gear and the first one way ratchet in the second one way drive means. In this embodiment, the planet gear and the first one way ratchet are formed as an integrated part. See FIGS. 15a-16, a plurality of pawl beds 83 are formed in the concave of the planet gear 77. A corresponding number of pawls 65 are each received in and pivotably fixed to the plurality of pawl beds 83. The spring ring 63 mounted on the pawls 65 forces the same to be in a standing position. There is also a ratchet 89 disposed in the concave of the planet gear 77, where a circle of rollers 79 are placed between the ratchet 89 and the planet gear 77. The rollers 79 functions to support the ratchet 89 on the planet gear 77 and allow the ratchet 89 to rotate with respect to the planet gear 77. On the outer circumference of the ratchet 89, there is arranged a plurality of teeth 85 adapted to engage with the pawls 65. A pressing ring 81 is arranged outside the planet gear 77 and fixed to the planet gear 77 by screws 91. The pressing ring 81 functions to prevent the ratchet 89 from throwing off from the planet gear 77.

The floating carrier 76 is moveably coupled to the ratchet 89 on one side of the floating carrier 76, and on the other side of the floating carrier 76 it is moveably coupled to the output flange 62. In other words, the floating carrier 76 is positioned between the ratchet 89 and the output flange 62. The output flange 62 is mechanically coupled to the sprocket 16 of the pedal driven apparatus. The floating carrier 76 is movably coupled to the ratchet 89 as well to the output flange 62 using a block-slot configuration similar to that described in the previous embodiment. On a side surface of the ratchet 89, there is arranged one or more blocks 66 which are in a cubic or rectangular shape. The blocks 66 are disposed on the surface of the ratchet inner ring of the ratchet 89. On a corresponding surface of the floating carrier 76 facing ratchet 89, there is provided one or more slots 64. Each block 66 on the ratchet 89 one-to-one corresponds to a slot 64 on the floating carrier 76 such that each of the one or more blocks 66 is adapted to be received and confined by a corresponding slot 64. As a result, the floating carrier 76 is driven to rotate by a rotation of the ratchet 89 via a transfer of the motor provided driving force between the one or more blocks 66 of the ratchet 89 and the one or more slots 64 of the floating carrier 76. Similarly, on a side surface of the floating carrier 76 facing the output flange 62, there is arranged one or more blocks 72 which are in a cubic or rectangular shape. Preferably, the number of blocks 72 disposed on the floating carrier 76 is also two. On a corresponding surface of the output flange 62 facing the floating carrier 76, there is provided one or more slots 74. Each block 72 on the floating carrier 76 one-to-one corresponds to a slot 74 on the output flange 62 such that each of the one or more blocks 72 is adapted to be received and confined by a corresponding slot 74. As a result, the output flange 62 is driven to rotate by a rotation of the floating carrier 76 via a transfer of the motor provided driving force between the one or more blocks 72 of the floating carrier 76 and the one or more slots 74 of the output flange 62.

Preferably, as shown in FIG. 16, the floating carrier mechanism of the pedal driven apparatus in this embodiment further includes one or more rollers 78 each corresponding to one of the one or more blocks 66 or 72 and a corresponding one of the one or more slots 64 or 74. Each roller 78 is adapted to fit in-between its corresponding block 66 or 72 and an end face of the corresponding slot 64 or 74.

In operation, when the planet gear 77 rotates in a forward direction, the ratchet 89 is driven to rotate due to the engagement of the pawls 65 and the teeth 85. However, when the ratchet 89 rotates in a forward direction, the pawls 65 leave the engagement with the teeth 85 and are slippery. As a result, the planet gear 77 is not driven to rotate.

As shown in FIG. 15(*c*), in this embodiment, the eccentric wheel 22 has a radius equal to a predetermined offset amount. The planet gear 77 is fit around the outer circumference of the eccentric wheel 22 by means of a bearing 21, Therefore, the planet gear 77 has an axis of rotation 200 which is offset by a predetermined amount with respect to an axis of rotation 201 of the motor shaft 4. In other words, the second one way drive means in this embodiment has an axis of rotation 200 offset by a predetermined amount with respect to an axis of rotation 201 of said motor shaft 4.

Figure 17:
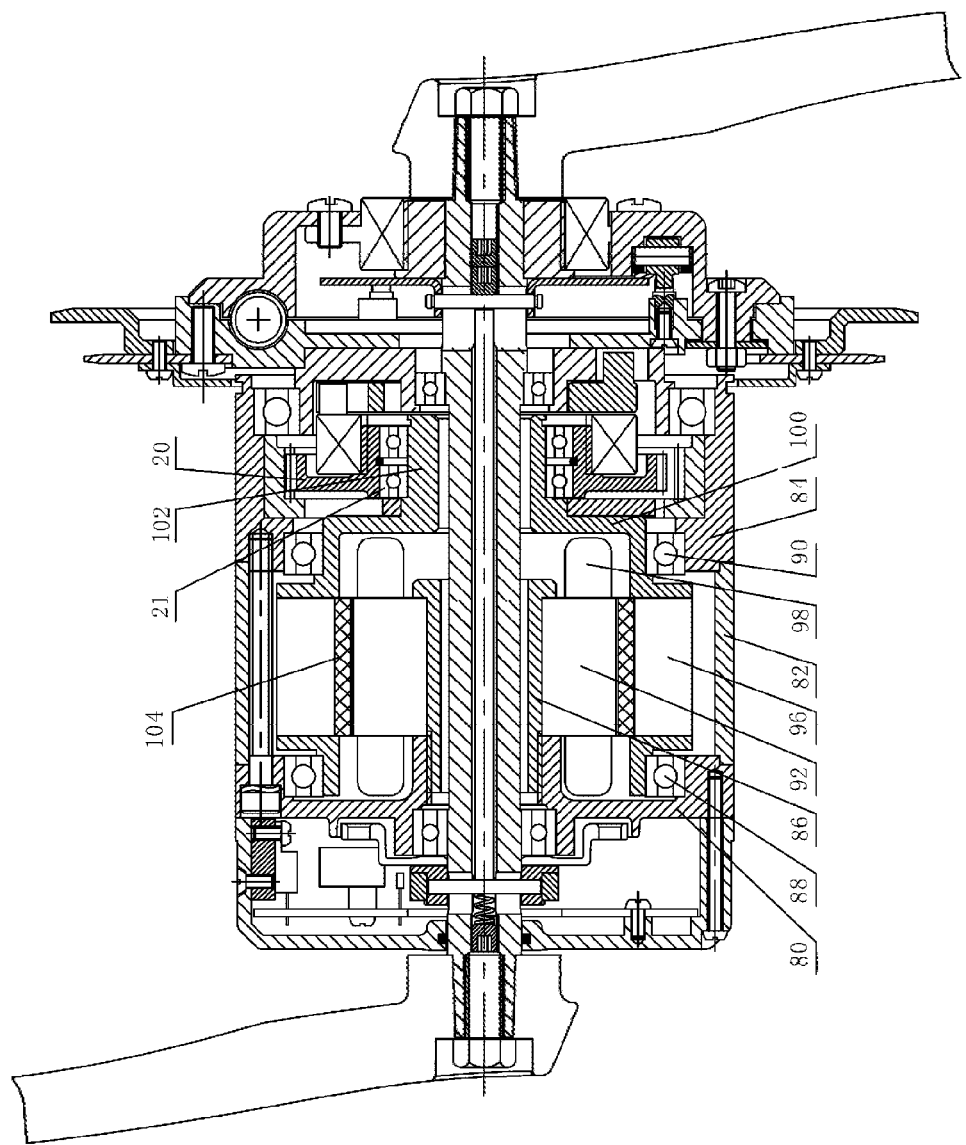
FIG. 17 is a structural schematic view of a seventh embodiment of a motor and sprocket assembly for a pedal driven apparatus according to the invention.

FIGS. 17 and 18 depict a seventh embodiment of the motor and sprocket assembly according to the invention. In the description of this embodiment, like numerals to those used in FIGS. 1 to 13 are used to denote like parts, although any differences in the parts are described in the following.

In this embodiment, the arrangement of components is generally identical to that of the fifth embodiment as shown in FIGS. 11-14 save for an internal structure of the motor in the assembly. Different from the previous embodiments illustrated in FIGS. 1-16, in which the motor of the pedal driven apparatus has an outer stator, inner rotor structure, the motor in the sixth embodiment as shown in FIG. 14 has an inner stator, outer rotor structure.

As shown in FIGS. 17-18, the casing of the motor in the pedal driving apparatus includes a rear end cover 80, a tubular portion 82 and a front end cover 84. The motor is arranged concentrically around a pedal spindle of the pedal driven apparatus such that the pedal spindle is freely accommodated through a shaft sleeve 86 of the motor and such that axes of rotation of the motor and the pedal spindle are parallel. The shaft sleeve 86 is fixed to the rear end cover 80 at one end, and preferably the shaft sleeve 86 is fixed to the rear end cover 80 by thread. A stator 92 of the motor is fixed to the rear end cover 80 and positioned to surround the shaft sleeve 86. The shaft sleeve 86 pushes the stator 92 against the rear end cover 80. There is a stator winding 98 arranged at the surface of the stator 92. A rotor 96 of the motor sleeves the stator 92 and the rotor 96 is rotatable with respect to the stator 92. A permanent magnet 104 is disposed on an inner surface of the rotor 96 facing the stator 92. A rotor carrier 100 is positioned to surround the rotor 96 and clamps the rotor 96 in the direction of the axis of rotation of the rotor 96, such that the rotor carrier 100 rotates together with the rotor 96 with a same angular velocity. On one end of the rotor carrier 100 toward the gear mechanism of the pedal driven apparatus, there is formed an elongated end portion 102 of the rotor carrier 100 which functions as the output of the motor provided driving force and is adapted to engage with the gear mechanism or other transmission part of the pedal driving apparatus. The shape of the elongated end portion 102 may be a gear, a hollow shaft, or other types of power output mechanism. Note that as the elongated end portion 102 of the rotor carrier 100 performs the function of outputting the driving force, there is no conventional motor shaft in the motor in this embodiment.

Preferably, as shown in FIGS. 17-18, the elongated end portion 102 is designed to have a cross-sectional shape of an eccentric wheel, with a radius of a portion of the elongated end portion 102 is different from the radius of another portion, thereby providing an eccentric rotation to the gear mechanism of the pedal driven apparatus. In this way, the eccentric wheel 22 in the fifth embodiment may be omitted as the elongated end portion 102 of the motor functions effectively as an eccentric wheel. The planet gear for example may be directly supported on the elongated end portion 102 of the motor to deliver the motor provided driving force to remaining part of the gear mechanism.

It will be appreciated that in other embodiments the elongated end portion 102 of the motor mentioned above can have a cylindrical cross-section like a convention motor shaft. In this configuration the eccentric gear may still be deployed as in the previous embodiments to provide eccentric rotation to the gear mechanism.

The design of a motor with inner stator, outer rotor structure is advantageous in some applications compared to conventional inner rotor, outer stator structure. One reason is that the fabrication of the windings on the inner stator is much easier than fabrication of windings on an outer stator due to the diminished size of the stator as well as the arrangement of the windings on its outer surface rather on an inner surface. Moreover, as the rotor in the above embodiment is supported by bearings on the motor casing rather than supported on the motor shaft in conventional motors, the rotation of the rotor is much more stable and relatively small tolerance of the rotation is introduced.

Figure 10:
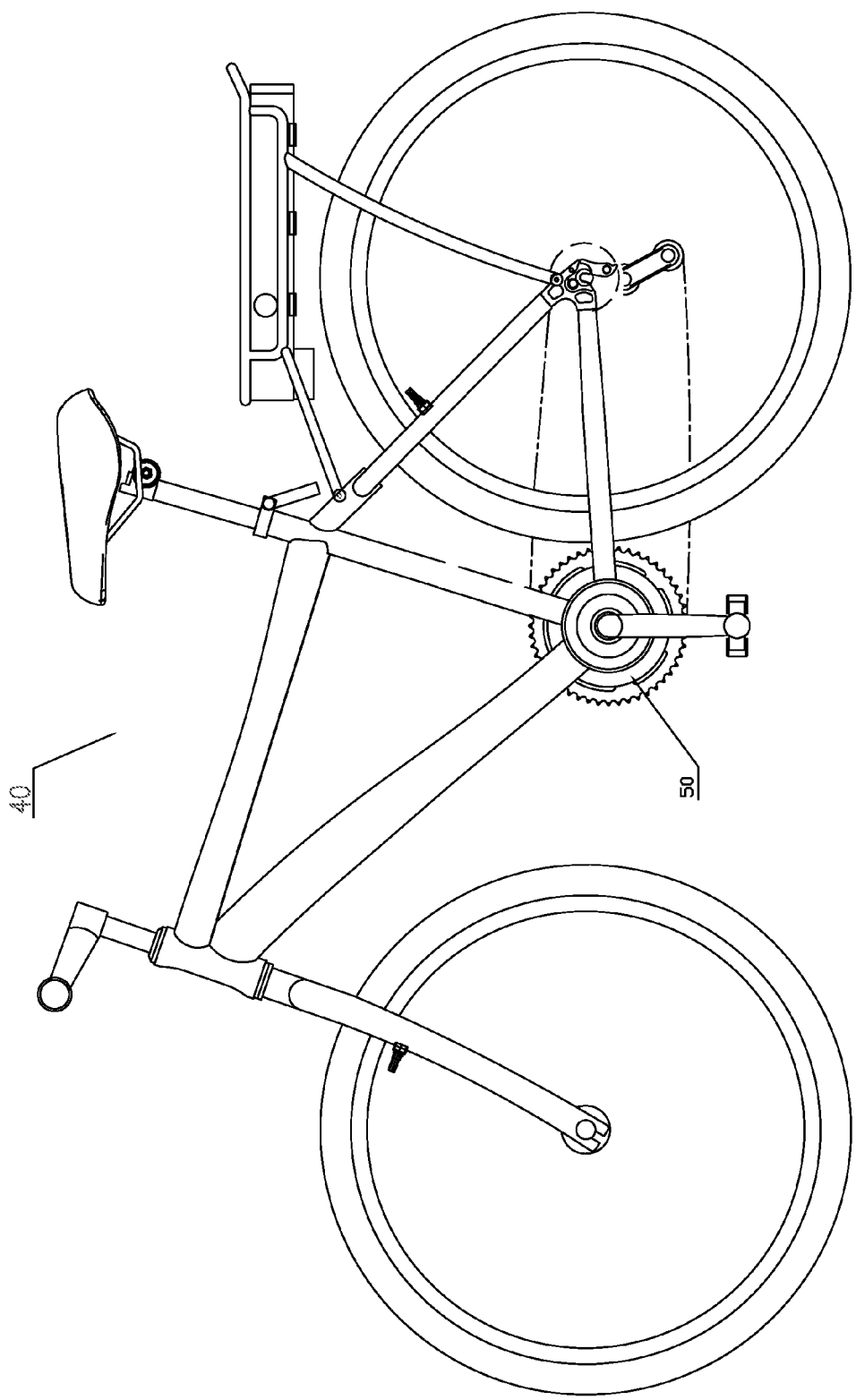
FIG. 10 is a schematic view of a pedal driven apparatus having a motor and sprocket assembly according to any of the embodiments of the invention.
Figure 11:
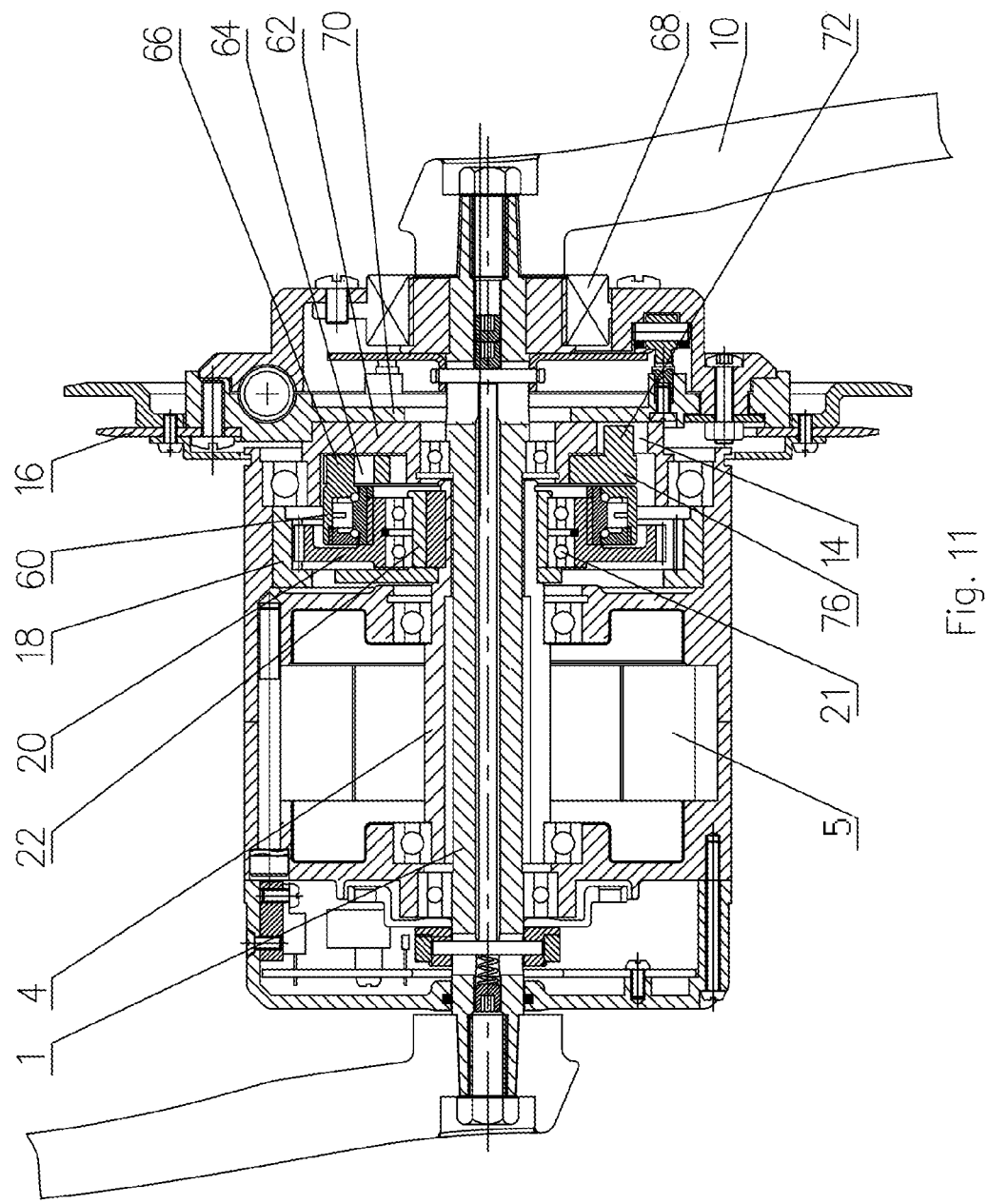
FIG. 11 is a structural schematic view of a fifth embodiment of a motor and sprocket assembly for a pedal driven apparatus according to the invention.

FIG. 10 depicts a bicycle 40 having a motor and sprocket assembly 50 according to any of the foregoing embodiments. The bicycle body may be provided with a recess at the position of the central spindle for receiving the motor and the gear mechanism. The assembly of the motor and the gear mechanism, together with the central pedal spindle, are received tightly in the recess.

It can be seen therefore that the invention provides a pedal driven apparatus comprising: manually operable pedals fixed for rotation with a pedal spindle for receiving a manually provided driving force; a motor having a shaft for receiving a motor provided driving force; a first torque transmission path for transferring the manually provided driving force to a sprocket of the pedal driven apparatus; a second torque transmission path for transferring the motor provided driving force to said sprocket of the pedal driven apparatus; wherein a first one way drive means is provided in the first torque transmission path between the pedal spindle and the sprocket such that when the sprocket is being driven by the motor provided driving force through the second torque transmission path, the pedal spindle is able to freewheel.

It can also be seen that the invention provides a motor for a pedal driven apparatus comprising: a shaft for receiving a motor provided driving force; and a gear mechanism mechanically coupling the motor shaft to a sprocket of the pedal driven apparatus, wherein the gear mechanism has a reduction gear ratio and operates to transfer the motor provided driving force from the motor shaft to the sprocket at said reduction gear ratio and wherein the motor is arranged concentrically around a pedal spindle of the pedal driven apparatus such that the pedal spindle is freely accommodated through a hollow bore of the motor shaft and such that their axes of rotation are parallel.

And it can be seen that the invention provides a sprocket assembly for a pedal driven apparatus, comprising: a sprocket; first means for mechanically coupling the sprocket to a pedal driven pedal spindle; and second means for mechanically coupling the sprocket to an output shaft of a motor, wherein the first mechanical coupling means includes a first one way drive means coupling the pedal spindle and the sprocket such that the first one way drive means transfers a manually provided driving force applied to the pedals of the pedal driven apparatus to the sprocket to cause rotation of the sprocket and allows the pedal spindle to freewheel when the sprocket is being driven by the motor output shaft.

As compared with known motor assisted bicycles, the invention has at least the following advantages:

1) The present invention uses a specially designed motor having a hollow shaft which is directly connected with a reduction planetary gear mechanism and which, due to the fact that the planet gear has fewer teeth or a smaller diameter than the ring gear, a sufficient transmission ratio can be obtained with the smallest space size. Therefore all of the parts together with the pedal central spindle can be constituted as a coaxial driving assembly, so that the structure is compact, the bicycle is light in weight, and its operation is more flexible;

(2) The present invention can be used in combination with a standard external transmission or internal transmission installed on the rear wheel of a bicycle, for either pedal driving or motor driving. The speed ratio can be varied during the riding of the bicycle so that the bicycle can be operated at the best driving efficiency with various ranges of speed on either hills or flats;

(3) The present invention is very practical, and can be directly installed on an existing bicycle after having the central spindle thereof modified slightly;

(4) With driving modes based on the above structure, it can reduce a rider's effort during riding;

(5) The present invention can be partially modified so as to become an exercise bicycle having a power generation function and other functions such as the battery can be charged by the inertial moment of the bicycle when going downhill or by the user pedaling; and (6) The present invention is novel in structure, simple in profile, and can be applied to various types of electric bicycles or electric assisted bicycles.

In general, the invention provides a hybrid bicycle which can be manually propelled, but which includes a motor unit for also causing forward propulsion of the bicycle. The bicycle comprises manually operable pedals fixed for rotation with a pedal spindle for receiving a manually provided driving force and a motor having a shaft for receiving a motor provided driving force. A first torque transmission path is provided for transferring the manually provided driving force to a sprocket of the pedal driven apparatus and a second torque transmission path is provided for transferring the motor provided driving force to said sprocket of the pedal driven apparatus. A first one way drive means is also provided. This is provided in the first torque transmission path between the pedal spindle and the sprocket such that when the sprocket is being driven by the motor provided driving force through the second torque transmission path, the pedal spindle is able to freewheel. A second one way drive means is provided in the second torque transmission path between the motor shaft and the sprocket such that when the sprocket is driven by the manually provided driving force through the first torque transmission path, the motor shaft is not caused to rotate. The second one way drive means has an axis of rotation offset by a predetermined amount with respect to an axis of rotation of the motor shaft. The second torque transmission path may include a gear mechanism mechanically coupling the motor shaft to the sprocket of the pedal driven apparatus. The gear mechanism has a reduction gear ratio and operates to transfer the motor provided driving force from the motor shaft to the sprocket at said reduction gear ratio. The motor may be arranged concentrically around a pedal spindle of the pedal driven apparatus such that the pedal spindle is freely accommodated through a hollow bore of the motor shaft and such that their axes of rotation are parallel and preferably co-incident.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A pedal driven apparatus comprising:
   manually operable pedals fixed for rotation with a pedal spindle for receiving a manually provided driving force;
   a motor having a shaft for receiving a motor provided driving force;
   a first torque transmission path for transferring said manually provided driving force to a sprocket of said pedal driven apparatus;
   a second torque transmission path for transferring said motor provided driving force to said sprocket of said pedal driven apparatus;
   wherein a first one way drive means is provided in said first torque transmission path between said pedal spindle and said sprocket such that when said sprocket is being driven by said motor provided driving force through said second torque transmission path, said pedal spindle is able to freewheel; and a second one way drive means is provided in said second torque transmission path between said motor shaft and said sprocket such that when said sprocket is being driven by said manually provided driving force through said first torque transmission path, said motor shaft is not caused to rotate; said second one way drive means having an axis of rotation offset by a predetermined amount with respect to an axis of rotation of said motor shaft; wherein said motor is arranged concentrically around said pedal spindle such that said pedal spindle is freely accommodated through a hollow bore of said motor shaft and such that their axes of rotation are parallel.

2. The pedal driven apparatus of claim 1, wherein said first torque transmission path comprises said manually operable pedals, said pedal spindle to which said pedals are affixed for rotation therewith, and said first one way drive means, wherein said first one way drive means mechanically couples said pedal spindle to said sprocket such that said first one way drive means transfers said manually provided driving force applied to said pedals to said sprocket to cause rotation of said sprocket and wherein said first one way drive means allows said pedal spindle to freewheel when said sprocket is being driven by said motor shaft.

3. The pedal driven apparatus of claim 2, wherein said first one way drive means is associated with one of said manually operable pedals affixed to said pedal spindle for rotation therewith, said one of said pedals comprising one of two pedals which is affixed to an end of said pedal spindle on a sprocket side of said pedal driven apparatus.

4. The pedal driven apparatus of claim 1, wherein said second torque transmission path comprises said motor shaft and a gear mechanism mechanically coupling said motor shaft to said sprocket, wherein said gear mechanism has a reduction gear ratio and operates to transfer said motor provided driving force from said motor shaft to said sprocket at said reduction gear ratio.

5. The pedal driven apparatus of claim 4, wherein said gear mechanism comprises a planetary gear mechanism having a planet gear whose axis of rotation is offset by a predetermined amount with respect to said axis of rotation of said motor shaft; an one way ratchet fixed onto said planet gear to rotate together with said planet gear, and having a ratchet axis co-incident with said axis of rotation of said planet gear.

6. The pedal driven apparatus of claim 5, wherein said planet gear is rotatably supported on an eccentric wheel whereby said planet gear and said one way ratchet are made to rotate as said eccentric wheel rotates; and whereby positions of said axis of rotation of said planet gear and said ratchet axis of said one way ratchet change relative to said axis of rotation of said motor shaft as said planet gear and said one way ratchet rotate such that said varying positions of said axis of rotation of said planet gear and said ratchet axis of said one way ratchet define a circle centered on said axis of rotation of said motor shaft, said circle having a radius equal to said predetermined offset amount.

7. The pedal driven apparatus of claim 6, wherein said planet gear has a smaller diameter than an internal diameter of an internal ring gear within which it locates for rotation therewithin, said internal ring gear being fixed in position and having a central axis co-incident with said axis of rotation of said motor shaft, said planet gear having a smaller number of teeth than said internal ring gear.

8. The pedal driven apparatus of claim 5, wherein said gear mechanism further comprises a floating carrier mechanism which is configured to transfer said motor provided driving force to said sprocket.

9. The pedal driven apparatus of claim 8, wherein said floating carrier mechanism further comprises an output flange and a floating carrier positioned between said one way ratchet and said output flange; said output flange mechanically coupled to said sprocket; said floating carrier movably coupled to said one way ratchet as well as to said output flange such that said motor provided driving force is transferred to said sprocket through said floating carrier and said output flange.

10. The pedal driven apparatus of claim 9, wherein on a surface of said one way ratchet facing said floating carrier, there is arranged one or more blocks; one or more slots provided on a corresponding surface of said floating carrier facing said one way ratchet; said one or more blocks each adapted to be received and confined by a corresponding one of said one or more slots such that said floating carrier is driven to rotate by a rotation of said one way ratchet via a transfer of said motor provided driving force between said one or more blocks of said one way ratchet and said one or more slots of said floating carrier.

11. The pedal driven apparatus of claim 10, wherein a rolling friction exists between each said block of said one or more blocks of said one way ratchet and said corresponding one of said one or more slots of said floating carrier.

12. The pedal driven apparatus of claim 11, wherein said floating carrier mechanism further comprises one or more rollers each corresponding to one of said one or more blocks and a corresponding one of said one or more slots; each said roller adapted to fit in-between said corresponding block and an end of said corresponding slot; whereby when said one way ratchet rotates due to said motor provided driving force, each said block pushes against said corresponding roller and causes said corresponding roller to rotate, which in turn pushes against said end of said slot of said corresponding floating carrier, resulting in said floating carrier rotating.

13. The pedal driven apparatus of claim 9, wherein on a surface of said floating carrier facing said output flange, there is arranged one or more blocks; one or more slots provided on a corresponding surface of said output flange facing said floating carrier; said one or more blocks each adapted to be received and confined by a corresponding one of said one or more slots such that said output flange is driven to rotate by a rotation of said floating carrier via a transfer of said motor provided driving force between said one or more blocks of said floating carrier and said one or more slots of said output flange.

14. The pedal driven apparatus of claim 13, wherein a rolling friction exists between each said block of said one or more blocks of said floating carrier and said corresponding one of said one or more slots of said output flange.

15. The pedal driven apparatus of claim 14, wherein said floating carrier mechanism further comprises one or more rollers each corresponding to one of said one or more blocks and a corresponding one of said one or more slots; each said roller adapted to fit in-between said corresponding block and an end of said corresponding slot; whereby when said floating carrier rotates due to said motor provided driving force, each said block pushes against said corresponding roller and causes said corresponding roller to rotate, which in turn pushes against said end of said corresponding slot of said output flange, resulting in said output flange rotating.

16. The pedal driven apparatus of claim 5, wherein said planetary gear mechanism includes a counterbalance member which is configured to counterbalance an imbalance of weight caused by said offsetting of said planet gear with respect to said axis of rotation of said motor shaft.

17. The pedal driven apparatus of claim 4, wherein said gear mechanism comprises a toothless planetary gear mechanism having a toothless planet gear whose axis of rotation is offset by a predetermined amount with respect to said axis of rotation of said motor shaft; a one way ratchet fixed onto said toothless planet gear to rotate together with that toothless planet gear, and having a ratchet axis co-incident with said axis of rotation of said toothless planet gear; wherein said reduction gear ratio of said toothless planetary gear mechanism is defined by a relationship between said respective diameters of said toothless planet gear and a toothless internal ring gear within which said toothless planet gear is located for rotation, said toothless planet gear having a smaller diameter than said toothless internal ring gear.

18. The pedal driven apparatus of claim 17, wherein said toothless planet gear is rotatably supported on an eccentric wheel whereby said toothless planet gear and said one way ratchet are made to rotate as said eccentric wheel rotates and whereby positions of said axis of rotation of said toothless planet gear and said ratchet axis of said one way ratchet change relative to said axis of rotation of said motor shaft as said toothless planet gear and said first one way ratchet rotate such that said varying positions of said axis of rotation of said toothless planet gear and said ratchet axis of said one way ratchet define a circle centered on said axis of rotation of said motor shaft, said circle having a radius equal to said predetermined offset amount.

19. The pedal driven apparatus of claim 18, wherein said toothless planet gear is rotatably supported on said eccentric wheel with its axis of rotation is offset by a predetermined amount with respect to said axis of rotation of said motor shaft and located within said toothless internal ring gear to engage a toothless inner ring gear surface by heating said toothless internal ring gear and shrink fitting it over said toothless planet gear.

20. The pedal driven apparatus of claim 17, wherein said toothless internal ring gear is fixed in position and has a central axis co-incident with said axis of rotation of said motor shaft.

21. The pedal driven apparatus of claim 17, wherein said gear mechanism further comprises a floating carrier mechanism which is configured to transfer said motor provided driving force to said sprocket.

22. The pedal driven apparatus of claim 21, wherein said floating carrier mechanism further comprises an output flange and a floating carrier positioned between said one way ratchet and said output flange; said output flange mechanically coupled to said sprocket; said floating carrier movably coupled to said one way ratchet as well as to said output flange such that said motor provided driving force is transferred to said sprocket though said floating carrier and said output flange.

23. The pedal driven apparatus of claim 22, wherein on a surface of said one way ratchet facing said floating carrier, there is arranged one or more blocks; one or more slots provided on a corresponding surface of said floating carrier facing said first one way ratchet; said one or more blocks each adapted to be received and confined by a corresponding one of said one or more slots such that said floating carrier is driven to rotate by a rotation of said one way ratchet via a transfer of driving force between said one or more blocks of said one way ratchet and said one or more slots of said floating carrier.

24. The pedal driven apparatus of claim 23, wherein a rolling friction exists between each said block of said one or more blocks of said one way ratchet and said corresponding one of said one or more slots of said floating carrier.

25. The pedal driven apparatus of claim 24, wherein said floating carrier mechanism further comprises one or more rollers each corresponding to one of said one or more blocks and a corresponding one of said one or more slots; each said roller adapted to fit in-between said corresponding block and an end of said corresponding slot; whereby when said first one way ratchet rotates due to said motor provided driving force, each said block pushes against said corresponding roller and causes said corresponding roller to rotate, which in turn pushes against said end of said slot of said corresponding floating carrier, resulting in said floating carrier rotating.

26. The pedal driven apparatus of claim 22, wherein on a surface of said floating carrier facing said output flange, there is arranged one or more blocks; one or more slots provided on a corresponding surface of said output flange facing said floating carrier; said one or more blocks each adapted to be received and confined by a corresponding one of said one or more slots such that said output flange is driven to rotate by a rotation of said floating carrier via a transfer of driving force between said one or more blocks of said floating carrier and said one or more slots of said output flange.

27. The pedal driven apparatus of claim 26, wherein a rolling friction exists between each said block of said one or more blocks of said floating carrier and said corresponding one of said one or more slots of said output flange.

28. The pedal driven apparatus of claim 27, wherein said floating carrier mechanism further comprises one or more rollers each corresponding to one of said one or more blocks and a corresponding one of said one or more slots; each said roller adapted to fit in-between said corresponding block and an end of said corresponding slot; whereby when said floating carrier rotates due to said motor provided driving force, each said block pushes against said corresponding roller and causes said corresponding roller to rotate, which in turn pushes against said end of said corresponding slot of said output flange, resulting in said output flange rotating.

29. The pedal driven apparatus of claim 17 wherein said toothless planetary gear mechanism includes a counterbalance member which is configured to counterbalance an imbalance of weight caused by said offsetting of said toothless planet gear with respect to said axis of rotation of said motor shaft.

30. The pedal driven apparatus of claim 1, wherein said pedal driven apparatus comprises a bicycle.

31. A motor for a pedal driven apparatus comprising:
  an output end for receiving a motor provided driving force; and
  a gear mechanism mechanically coupling said output end to a sprocket of said pedal driven apparatus, wherein said gear mechanism has a reduction gear ratio and operates to transfer said motor provided driving force from said output end to said sprocket at said reduction gear ratio and
  wherein said motor is arranged concentrically around a pedal spindle of said pedal driven apparatus such that said pedal spindle is freely accommodated through a hollow bore of a shaft sleeve and such that axes of rotation of said motor and said pedal spindle are parallel; and
  wherein a stator of said motor is positioned to surround said shaft sleeve; said stator of said motor further sleeved by a rotor of said motor such that said rotor is rotatable with respect to said stator.

32. The motor of claim 31, further comprises a rotor carrier mechanically fixed to said rotor so that said rotor carrier rotates together with said rotor; said rotor carrier having an end portion which outputs said motor provided driving force.

* * * * *